US009886770B2

(12) United States Patent
Inaguma et al.

(10) Patent No.: US 9,886,770 B2
(45) Date of Patent: Feb. 6, 2018

(54) IMAGE PROCESSING DEVICE AND METHOD, IMAGE PROCESSING SYSTEM, AND IMAGE PROCESSING PROGRAM

(71) Applicant: Sony Corporation, Tokyo (JP)

(72) Inventors: Ritsuo Inaguma, Tokyo (JP); Takanobu Ujisato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/400,012

(22) Filed: Jan. 6, 2017

(65) Prior Publication Data

US 2017/0124722 A1    May 4, 2017

Related U.S. Application Data

(60) Division of application No. 14/589,024, filed on Jan. 5, 2015, which is a continuation of application No. (Continued)

(30) Foreign Application Priority Data

Dec. 4, 2008    (JP) .................................. 2008-309969

(51) Int. Cl.
*G06T 7/246*    (2017.01)
*G06K 9/00*    (2006.01)
*G01S 11/12*    (2006.01)

(52) U.S. Cl.
CPC .............. *G06T 7/246* (2017.01); *G01S 11/12* (2013.01); *G06K 9/00624* (2013.01); *G06T 2207/10004* (2013.01)

(58) Field of Classification Search
CPC ........... G06T 7/246; G06T 2207/10004; G01S 11/12; G06K 9/00624
See application file for complete search history.

(56) References Cited

U.S. PATENT DOCUMENTS 5,999,877 A * 12/1999 Takahashi .......... G06K 9/00785
340/905
6,452,628 B2    9/2002 Kato
(Continued)

FOREIGN PATENT DOCUMENTS

JP    2004 194309    7/2004
JP    2006 33224    2/2006
(Continued)

OTHER PUBLICATIONS

Office Action issued in the corresponding Chinese Application No. 201310308898.4 dated Feb. 6, 2016 and its English Translation.

*Primary Examiner* — Abdullahi E Salad
(74) *Attorney, Agent, or Firm* — Haug Partners LLP; William S. Frommer

(57) ABSTRACT

An image processing device includes: an entire image display control portion that performs control to display an entire image of a predetermined region in an entire image display window; and a cutout image display control portion that performs control to enlarge a plurality of tracking subjects included in the entire image and display the tracking subjects in a cutout image display window. The cutout image display control portion performs the control in such a manner that one cutout image including the tracking subjects is displayed in the cutout image display window in a case where relative distances among the tracking subjects are equal to or smaller than a predetermined value, and that two cutout images including the respective tracking subjects are displayed in the cutout image display window in a case where the relative distances among the tracking subjects are larger than the predetermined value.

14 Claims, 24 Drawing Sheets

Related U.S. Application Data

13/733,189, filed on Jan. 3, 2013, now Pat. No. 8,957,971, which is a continuation of application No. 12/629,139, filed on Dec. 2, 2009, now Pat. No. 8,363,107.

(56) References Cited

U.S. PATENT DOCUMENTS

| | | |
|---|---|---|
| 7,015,976 B1 | 3/2006 | Orr et al. |
| 7,432,984 B2 | 10/2008 | Oh |
| 7,899,208 B2 * | 3/2011 | Kondo ............... G06K 9/32 348/135 |
| 8,004,506 B2 | 8/2011 | Suzuki |
| 8,004,565 B2 | 8/2011 | Herz |
| 8,466,977 B2 | 6/2013 | Yoshida et al. |
| 8,879,794 B2 * | 11/2014 | Kokubun ............ G03B 35/08 348/169 |
| 2001/0040636 A1 | 11/2001 | Kato et al. |
| 2007/0070201 A1 * | 3/2007 | Yokomitsu ........... G06T 7/246 348/169 |
| 2007/0242088 A1 | 10/2007 | Kim et al. |
| 2007/0268369 A1 | 11/2007 | Amano et al. |
| 2007/0279494 A1 | 12/2007 | Aman et al. |
| 2008/0277585 A1 | 11/2008 | Hasegawa et al. |
| 2009/0002499 A1 | 1/2009 | Nobuoka |
| 2009/0153666 A1 * | 6/2009 | Takeuchi ........... G01S 3/7864 348/169 |

FOREIGN PATENT DOCUMENTS

| | | |
|---|---|---|
| JP | 2006 81053 | 3/2006 |
| JP | 2006 121261 | 5/2006 |
| JP | 2006 245793 | 9/2006 |
| JP | 2006 311578 | 11/2006 |
| JP | 2007 158680 | 6/2007 |
| JP | 2007 158829 | 6/2007 |
| JP | 2007 274543 | 10/2007 |
| JP | 2008 167127 | 7/2008 |
| JP | 2008 252915 | 10/2008 |

* cited by examiner

IMAGE PROCESSING DEVICE AND METHOD, IMAGE PROCESSING SYSTEM, AND IMAGE PROCESSING PROGRAM

This is a division of application Ser. No. 14/589,024, filed Jan. 5, 2015, which is a continuation of application Ser. No. 13/733,189, filed Jan. 3, 2013, now U.S. Pat. No. 8,957,971, issued Feb. 17, 2015, which is a continuation of application Ser. No. 12/629,139, filed Dec. 2, 2009, now U.S. Pat. No. 8,363,107, issued Jan. 29, 2013, which claims priority under 35 USC 119 to Japanese Application No. 2008-309969, filed in Japan Dec. 4, 2008, the entirety of which is incorporated herein by reference.

BACKGROUND OF THE INVENTION

1. Field of the Invention

The present invention relates to image processing device and method, an image processing system, and an image processing program for tracking and displaying a plurality of moving objects.

2. Description of Related Art

There is an image processing system that displays a moving object by tracking the moving object using a monitoring camera or the like. JP-A-2006-121261 describes a technique of calculating pan-tilt angle information of a swivel base on which is mounted a camera according to position information and height information of a moving object obtained from a GPS (Global Positioning System) and controlling the camera with the angle of the swivel base so as not to lose track of the moving object using the single camera. Also, a technique of tracking a plurality of moving objects is described in "Kakushindo-tsuki kasetsugunno sougosayounimotozuku fukusuutaishou tsuiseki" *Computer Vision and Image Media* vol. 43 No. SIG4 (CVIM 4), June 2006.

SUMMARY OF THE INVENTION

When a plurality of moving objects are tracked by a single camera, there may be a case where a moving object is no longer tracked depending on motions of the moving object. In order to eliminate this inconvenience, each of a plurality of the moving objects may be tracked by a different camera. In this case, however, it is quite difficult to keep track of the positional relation among all the moving objects within images generated by the respective cameras.

As a technique of tracking detected moving objects while keeping track of the positional relation, a radar system is generally used. The radar system, however, provides poor visual information and is therefore not suitable to identify a moving object.

There is another technique of tracking and displaying a plurality of moving objects by extracting the moving objects individually in the tracking processing. According to such a technique, in a case where two moving objects overlap, the overlapping moving objects are tracked as one moving object and when the two moving objects are separated, the two moving objects are recognized as newly generated moving objects. It is therefore difficult to track a plurality of moving objects precisely.

In a case where a plurality of moving objects are tracked and all the moving objects are displayed on a single screen, the display size of each moving object on the screen becomes too small to identify each moving object when the moving objects are distant very much from one another. Meanwhile, when a window is provided to each moving object to display each moving object, in a case where a plurality of the moving objects come close together, the same image is displayed in more than one window. It thus becomes difficult to use the display screen effectively.

It is therefore desirable to use the display screen effectively while making it easier for the user to recognize respective moving objects in the tracking and displaying processing for a plurality of moving objects.

According to an embodiment of the present invention, there is provided an image processing device including an entire image display control portion that performs control to display an entire image of a predetermined region in an entire image display window, and a cutout image display control portion that performs control to enlarge a plurality of tracking subjects included in the entire image and display the tracking subjects in a cutout image display window. The cutout image display control portion performs the control in such a manner that one cutout image including the plurality of tracking subjects is displayed in the cutout image display window in a case where relative distances among the plurality of tracking subjects are equal to or smaller than a predetermined value and performs the control in such a manner that two cutout images including the respective tracking subjects are displayed in the cutout image display window in a case where the relative distances among the plurality of tracking subjects are larger than the predetermined value.

According to another embodiment of the present invention, there is provided an image processing system including an image transmission device having a camera portion that generates image data, an image data processing portion that generates compressed image data by encoding the image data generated by the camera portion, and a data transmission portion that transmits the compressed image data generated by the image data processing portion, and an image processing device having a data reception portion that receives the compressed image data, an entire image display control portion that performs control to display an entire image of a predetermined range generated from image data obtained by decoding the compressed image data received at the data reception portion in an entire image display window, and a cutout image display control portion that performs control to enlarge a plurality of tracking subjects included in the entire image and display the tracking subjects in a cutout image display window. The cutout image display control portion performs the control in such a manner that one cutout image including the plurality of tracking subjects is displayed in the cutout image display window in a case where relative distances among the plurality of tracking subjects are equal to or smaller than a predetermined value and performs the control in such a manner that two cutout images including the respective tracking subjects are displayed in the cutout image display window in a case where the relative distances among the plurality of tracking subjects are larger than the predetermined value.

According to still another embodiment of the present invention, there is provided an image processing method including the steps of performing control to display an entire image of a predetermined region in an entire image display window and performing control to enlarge a plurality of tracking subjects included in the entire image and display the tracking subjects in a cutout image display window. In the step of displaying the tracking subjects, the control is performed in such a manner that one cutout image including the plurality of tracking subjects is displayed in the cutout image display window in a case where relative distances among the plurality of tracking subjects are equal to or smaller than a predetermined value and the control is performed in such a manner that two cutout images including the respective tracking subjects are displayed in the cutout image display window in a case where the relative distances among the plurality of tracking subjects are larger than the predetermined value.

According to still another embodiment of the present invention, there is provided an image processing program causing a computer to perform the steps of performing control to display an entire image of a predetermined region in an entire image display window and performing control to enlarge a plurality of tracking subjects included in the entire image and display the tracking subjects in a cutout image display window. In the step of displaying the tracking subjects, the control is performed in such a manner that one cutout image including the plurality of tracking subjects is displayed in the cutout image display window in a case where relative distances among the plurality of tracking subjects are equal to or smaller than a predetermined value and the control is performed in such a manner that two cutout images including the respective tracking subjects are displayed in the cutout image display window in a case where the relative distances among the plurality of tracking subjects are larger than the predetermined value.

According to the embodiments of the present invention, the user becomes able to obtain detailed images of the tracking subjects that have not been obtained by the wide angle imaging while keeping track of the positional relation among the tracking subjects in the entire image display window. According to the embodiments of the present invention, in a case where the relative distances between the respective tracking subjects are equal to or smaller than the predetermined threshold value, the user becomes able to track a plurality of the tracking subjects as a group by displaying all the tracking subjects in one cutout image display window. According to the embodiments of the invention, even in a case where the relative distances among a plurality of the respective tracking subjects are larger than the predetermined value, by displaying two cutout images including the respective tracking subjects in the cutout image display window, the user becomes able to keep track of a detailed image for each of a plurality of the tracking subjects.

As has been described, according to the embodiments of the present invention, even when there are a large number of tracking subjects, the user becomes able to keep track of the tracking subjects precisely according to the positional relation among the tracking subjects displayed in the entire image display window.

DESCRIPTION OF THE PREFERRED EMBODIMENTS

Hereinafter, concrete embodiments to which the present invention is applied will be described in detail with reference to the drawings.

Figure 1:
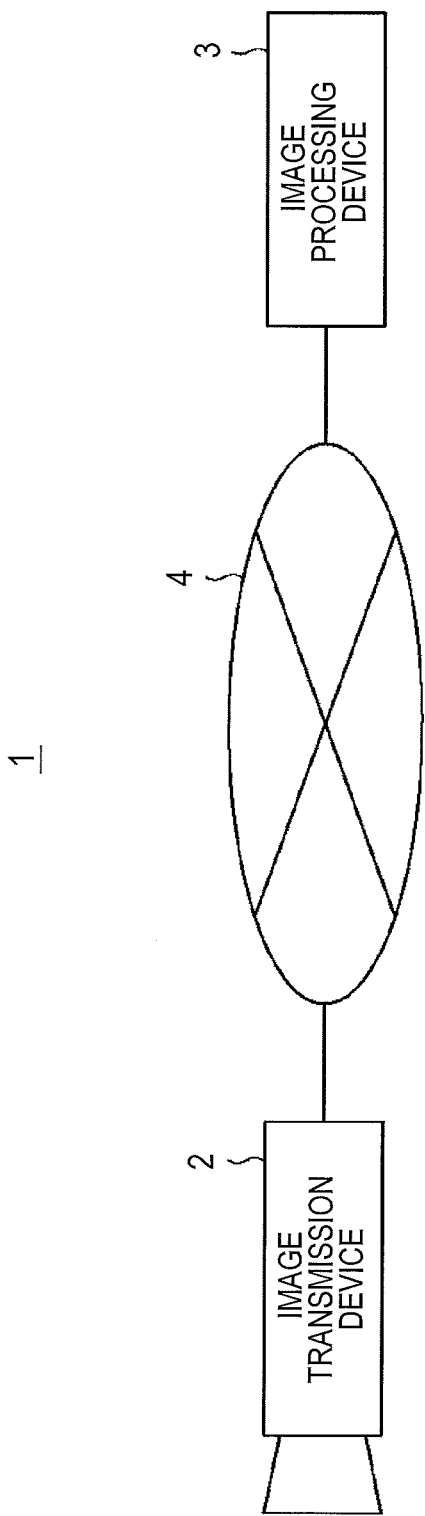
FIG. 1 is a view showing an image processing system according to an embodiment to which the present invention is applied.

FIG. 1 is a view showing an image processing system 1 according to an embodiment to which the present invention is applied. The image processing system 1 includes an image transmission device 2 and an image processing device 3 connected to each other via a network 4, such as a LAN (Local Area Network) and the Internet.

Figure 2:
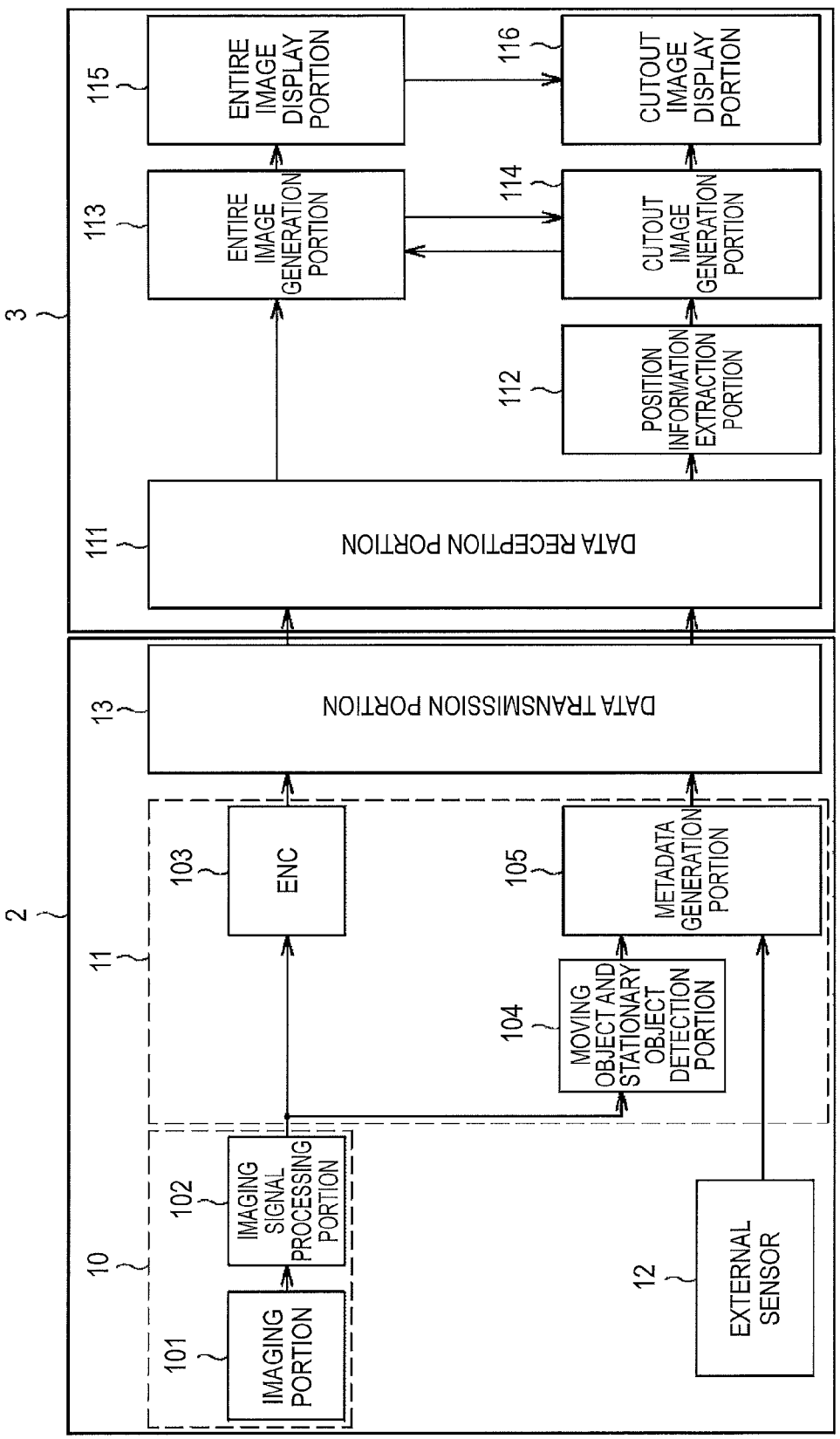
FIG. 2 is a view showing the internal configuration of an image transmission device and an image processing device.

FIG. 2 is a view showing the internal configuration of the image transmission device 2 and the image processing device 3. The image transmission device 2 transmits an image signal generated from an imaging signal to the image processing device 3 via the network 4. The image processing device 3 applies predetermined signal processing to the image signal received from the image transmission device 2 via the network 4. Then, the image processing device 3 makes an entire image, which is an image of the imaging region, and a cutout image, which is an image obtained by cutting out a region including moving objects as tracking subjects from the entire image, be displayed in different windows.

The image transmission device 2 includes a camera portion 10, an image data processing portion 11, an external sensor 12, and a data transmission portion 13. The camera portion 10 includes an imaging portion 101 and an imaging signal processing portion 102. The image data processing portion 11 includes an encoder (ENC) 103, a moving object and stationary object detection portion 104, and a metadata generation portion 105.

In the camera portion 10, the imaging portion 101 has an imaging lens (not shown) and an imaging element (not shown) formed of a CCD (Charged Coupled Device) or a CMOS (Complementary Metal-Oxide Semiconductor). In the imaging portion 101, the imaging element captures an image of a predetermined region via the imaging lens to generate an imaging signal and supplies the imaging signal processing portion 102 with the imaging signal. The imaging signal processing portion 102 applies processing, such as sample hold, gain control, and A/D (Analog-to-Digital) conversion, and processing, such as a white balance adjustment and a gamma correction, to the imaging signal supplied from the imaging portion 101. The imaging signal processing portion 102 supplies the encoder 103 and the moving object and stationary object detection portion 104 in the image data processing portion 11 with image data generated through the processing specified above.

The encoder 103 applies encoding processing by the MPEG (Moving Picture Experts Group)-4 coding method to the image data supplied from the imaging signal processing portion 102 and supplies the data transmission portion 13 with compressed image data.

The moving object and stationary object detection portion 104 performs processing to detect a moving object and a stationary object from the image data supplied from the imaging signal processing portion 102. The moving object and stationary object detection portion 104 supplies the metadata generation portion 105 with detection information of the moving object and the stationary object.

Detection information of a moving object from the external sensor 12 is also supplied to the metadata generation portion 105. The external sensor 12 is formed, for example, of an infrared sensor, a temperature sensor, or a sound sensor. The external sensor 12 supplies the metadata generation portion 105 with information informing the detection of a moving object on the basis of an infrared ray, a temperature, or a sound. The metadata generation portion 105 generates metadata including detection information of the moving object and the stationary object supplied from the moving object and stationary object detection portion 104 and the detection information from the external sensor 12 and supplies the data transmission portion 13 with the metadata.

The data transmission portion 13 transmits the image data supplied from the encoder 103 to the image processing device 3 via the network 4 according to the TCP/IP (Transmission Control Protocol/Internet Protocol). The data transmission portion 13 also transmits the metadata supplied from the metadata generation portion 105 to the image processing device 3 via the network 4.

The image processing device 3 includes a data reception portion 111, a position information extraction portion 112, an entire image generation portion 113, a cutout image generation portion 114, an entire image display portion 115, and a cutout image display portion 116.

Although it is not shown in the drawing, the image processing device 3 includes a CPU (Central Processing Unit), a working RAM (Random Access Memory), a ROM (Read Only Memory) that stores an image processing program according to one embodiment of the present invention, data, and so forth. By running the image processing program on the CPU, a series of processing by the image processing device 3 is performed. The image processing program may be recorded, for example, in a recording medium, such as a CD-ROM, so that it can be provided from the outside.

The data reception portion 111 receives the image data and the metadata from the image transmission device 2. The data transmission portion 111 supplies the entire image generation portion 113 with the received image data. Also, the data reception portion 111 supplies the position information extraction portion 112 with the received image data and metadata.

The position information extraction portion 112 specifies an image frame in which moving objects are detected from the image data received at the data reception portion 111 according to the metadata of the detection information of the moving object and the stationary object. The image processing device 3 further includes an operation portion (not shown) used to specify a plurality of tracking subjects in response to an operation by the user from the entire image being displayed in the entire image display window. Of the moving objects, moving objects defined as the tracking subjects are set when specified in response to an operation by the user. A setting signal informing the setting is supplied to the position information extraction portion 112.

The position information extraction portion 112 applies predetermined arithmetic processing to the image frame in which the moving objects are detected to extract the position information of the moving objects as the tracking subjects in the image and supplies the cutout image generation portion 114 with the extracted position information. Which moving objects are set as the tracking subjects is specified, for example, by a setting operation by the user. Also, the position information extraction portion 112 supplies the cutout image generation portion 114 with the image data received at the data reception portion 111.

Alternatively, it may be configured in such a manner that the position information extraction portion 112 takes in the position information of the tracking subjects from the outside using the GPS (Global Positioning System) and performs processing to convert the position information of the tracking subjects to the position information in the image.

The entire image generation portion 113 supplies the entire image display portion 115 with an image of the image data supplied from the data reception portion 111 as the entire image.

The cutout image generation portion 114 calculates relative distances between the respective tracking subjects according to the position information of the tracking subjects supplied from the position information extraction portion 112 and determines whether the relative distances are larger than a predetermined value, that is, a predetermined threshold value. The relative distances are calculated according to either one or both of the sizes of the tracking subjects within the entire image and distances between the respective tracking subjects within the entire image. The cutout image generation portion 114 then specifies a cutout range on the basis of this determination and supplies the entire image generation portion 113 with the information of this cutout range as angle-of-view information. The entire image generation portion 113 cuts out an image of the cutout range according to the angle-of-view information supplied from the cutout image generation portion 114 from the entire image and it supplies the cutout image generation portion 114 with the cutout image.

In a case where the relative distances between the respective tracking subjects calculated according to the position information extracted by the position information extraction portion 112 are equal to or smaller than the predetermined threshold value, the cutout image generation portion 114 specifies one cutout range including all the tracking subjects having the relative distances between the respective tracking subjects equal to or smaller than the predetermined threshold value according to the position information. The cutout image generation portion 114 then generates an image of this cutout range as a cutout image. Meanwhile, in a case where the relative distances between the respective tracking subjects are larger than the predetermined threshold value, the cutout image generation portion 114 specifies two cutout ranges including the respective tracking subjects having the relative distances far larger than the predetermined threshold value according to the position information. The cutout image generation portion 114 then generates images of the specified cutout ranges as cutout images.

The cutout image generation portion 114 enlarges the generated cutout image(s) at an arbitrary enlargement ratio in response to an operation by the user or according to its own determination. Also, the cutout image generation portion 114 may reduce the image enlarged once at an arbitrary reduction ratio in response to an operation by the user or according to its own determination. The cutout image generation portion 114 supplies the cutout image display portion 116 with the generated cutout image(s). The cutout image generation portion 114 is capable of changing the enlargement ratio or the reduction ratio of the cutout image(s) arbitrarily in response to a setting operation by the user. In addition, the cutout range(s) is specified according to the position information of the tracking subjects extracted by the position information extraction portion 112 so as to include the tracking subjects completely.

It should be noted that the cutout image generation portion 114 is capable of generating three or more cutout images by repetitively performing the arithmetic processing between the respective tracking subjects according to the position information of the tracking subjects.

The image processing device 3 includes a display, such as an LCD (Liquid Crystal Display). The display provided to the image processing device 3 displays, for example, a display screen 21 shown in FIG. 3. On the display screen 21, the entire image of a predetermined region is displayed in an entire image display window 22. Also, on the display screen 21, a cutout image(s) cut out from the entire image being displayed in the entire image display window 22 is displayed in a cutout image display window 24. The entire image display portion 115 displays the entire image supplied from the entire image generation portion 113 in the entire image display window 22. The cutout image display portion 116 displays the cutout image(s) supplied from the cutout image generation portion 114 in the cutout image display window 24.

In this manner, the image processing device 3 includes the entire image generation portion 113 and the entire image display portion 115 and performs control to display the entire image of the predetermined region in the entire image display window. Also, the image processing device 3 includes the cutout image generation portion 114 and the cutout image display portion 116 and performs control to enlarge a plurality of tracking subjects included in the entire image and display the tracking subjects in the cutout image display window.

It should be appreciated that an image of the image data transmitted from the image transmission device 2 can be either a moving image or a still image.

In a case where the image is a moving image, an image can be displayed in real time in the entire image display window and the cutout image display window.

In a case where the image is a still image, a cutout image displayed in the cutout image display window is an image coinciding with the entire image being displayed in the entire image display window. Alternatively, it may be configured in such a manner that a cutout image displayed in the cutout image display window is updated at arbitrarily set time intervals. In this case, the cutout image display portion 116 updates an image to be displayed in the cutout image display window in response to a setting operation by the user or at every arbitrary time according to its own determination.

Figure 4:
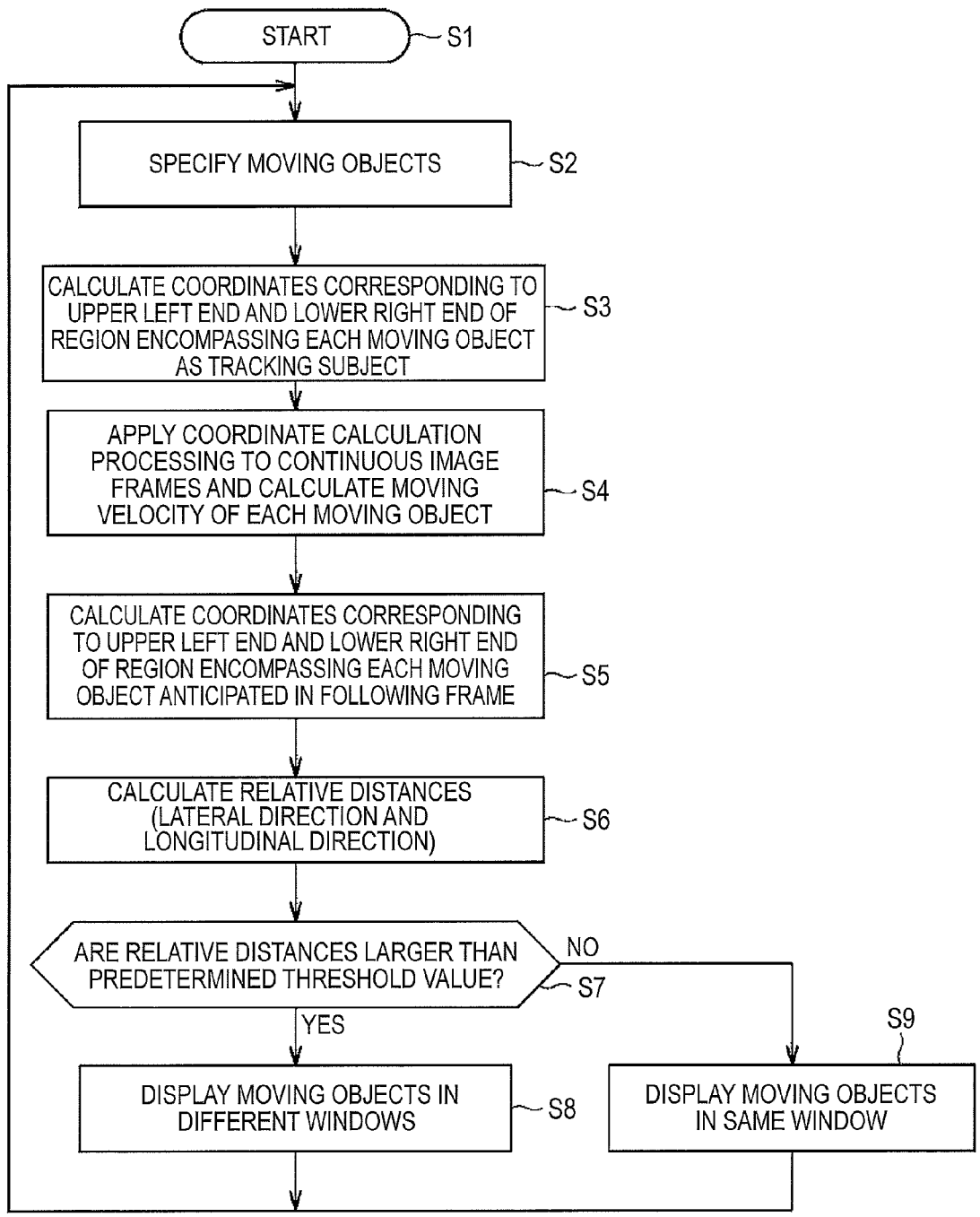
FIG. 4 is a flowchart used to describe a moving object tracking and displaying processing operation on the basis of moving object detection.

An operation example of moving object tracking and displaying processing by the image processing system 1 will now be described. FIG. 4 is a flowchart used to describe the moving object tracking and displaying processing operation on the basis of moving object detection.

In Step S1, the position information extracting portion 112 starts the position information extraction processing by the moving object detection processing.

In Step S2, from an image frame supplied from the data reception portion 111, the position information extraction portion 112 extracts position information of moving objects as tracking subjects in the image frame including moving objects according to the metadata of the moving object detection information supplied from the metadata generation portion 105.

Figure 5:
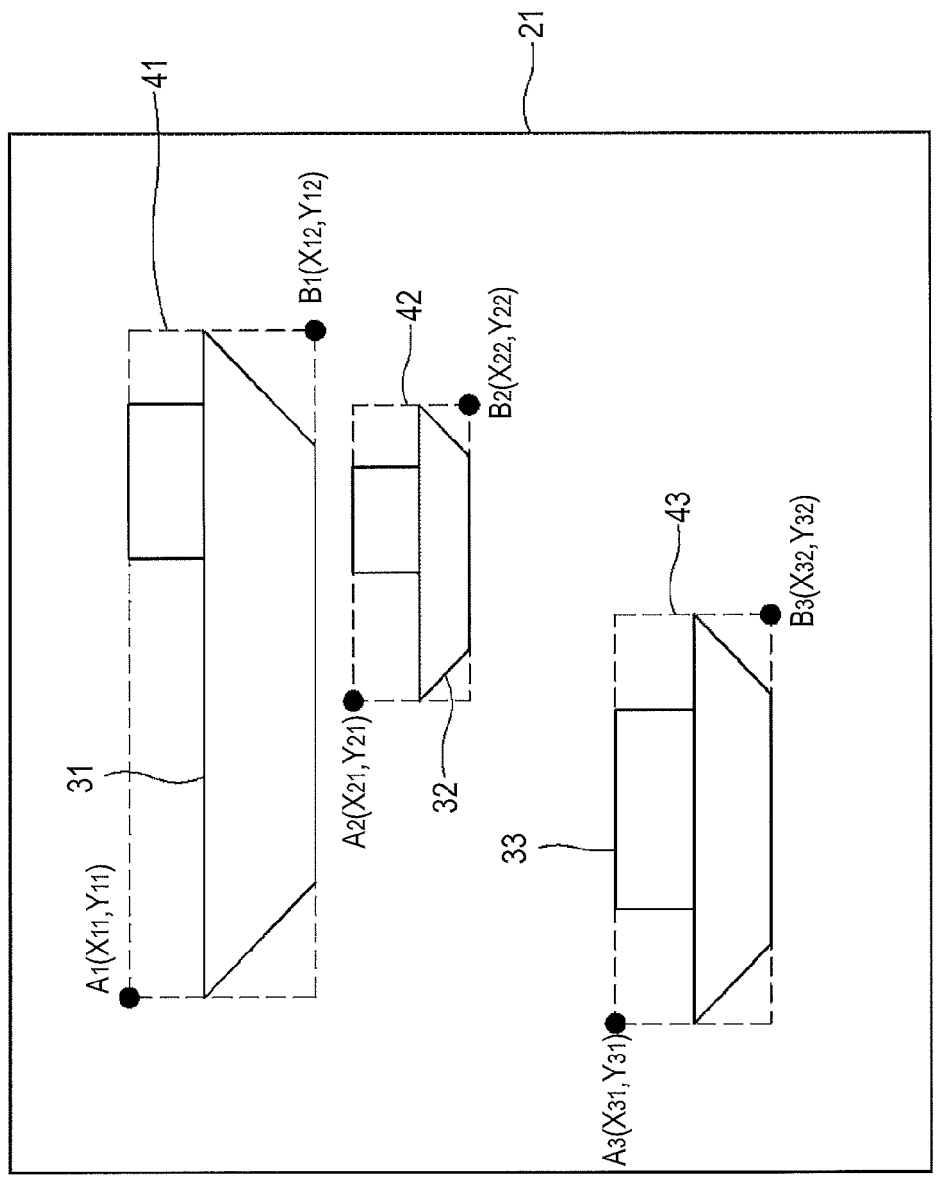
FIG. 5 is a view showing an example of a display screen shown on a display provided to the image processing device.
Figure 6:
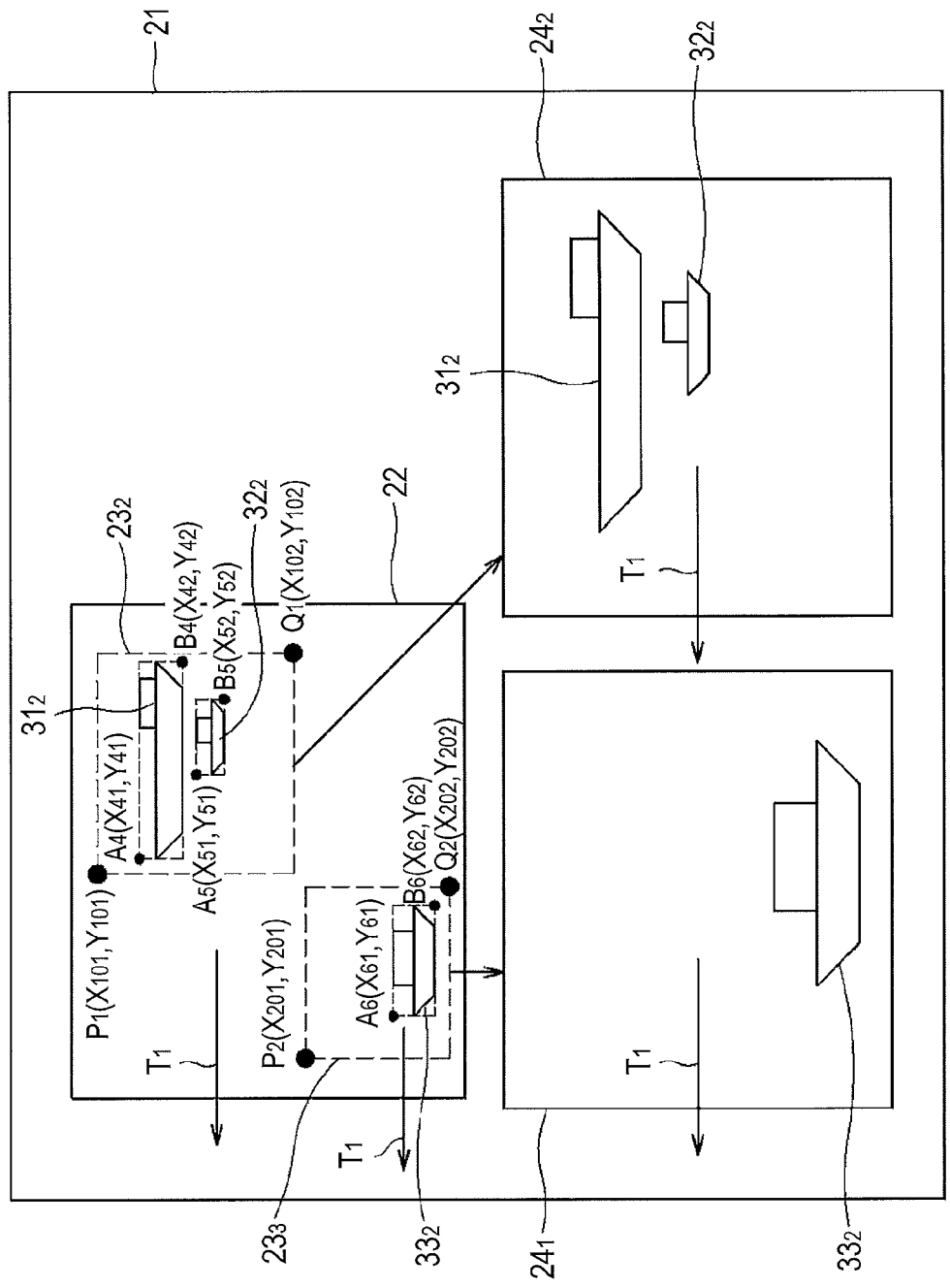
FIG. 6 is a view showing a manner in which a plurality of moving objects are cut out and displayed on a display screen shown on a display provided to the image processing device.

For example, as is shown in FIG. 5, the moving object and stationary object detection portion 104 detects moving objects 31 through 33 in an imaging region corresponding to the display screen 21. In this case, the metadata generation portion 105 generates metadata of information informing the detection of the moving objects 31 through 33. The position information extraction portion 112 specifies an image frame including the moving objects 31 through 33 using the image data supplied from the data reception portion 111. Herein, assume that the moving objects 31 through 33 are all set as tracking subjects in response to a setting operation by the user. A setting signal informing the setting is supplied to the position information extraction portion 112.

In Step S3, the position information extraction portion 112 calculates a coordinate (upper left end point) corresponding to the upper left end of an image region encompassing a tracking subject and a coordinate (lower right endpoint) corresponding to the lower right end in the specified image frame. Herein the coordinate is expressed by (x, y).

In Step S4, the position information extraction portion 112 performs calculation processing of the coordinates (x, y) of the upper left end point and the lower right end point of the image region of an image including a moving object in a plurality of continuous image frames obtained in the past and stored in a buffer (not shown) provided to the image processing device 3. Herein, the upper left endpoint and the lower right end point can be set so as to include the moving object within the image region completely. The position information extraction portion 112 then calculates moving velocities of the respective moving objects within the image frame using the calculated coordinates (x, y) of the upper left end points and the lower right end points in the image frames in the past.

In Step S5, the position information extraction portion 112 calculates predicted values of the coordinates (x, y) of the upper left end point and the lower right end point of an image region encompassing each tracking subject in the following image frame supplied from the data reception portion 111 on the basis of the moving velocities of the respective moving objects calculated in Step S4. An image region in which each tracking subject is encompassed is thus specified.

For instance, referring to FIG. 5, the position information extraction portion 112 calculates the upper left end point $A_1$ ($X_{11}$, $Y_{11}$) and the lower right end point $B_1$ ($X_{12}$, $Y_{12}$) of an image region 41 encompassing the moving object 31 using the display screen 21 as the plane of coordinates. Also, the position information extraction portion 112 calculates the upper left end point $A_2$ ($X_{21}$, $Y_{21}$) and the lower right end point $B_2$ ($X_{22}$, $Y_{22}$) of an image region 42 encompassing the moving object 32 and the upper left end point $A_3$ ($X_{31}$, $Y_{31}$) and the lower right end point $B_3$ ($X_{32}$, $Y_{32}$) of an image region 43 encompassing the moving object 33 in the display screen 21. The position information extraction portion 112 then supplies the cutout image generation portion 114 with the calculated coordinates as the position information of the moving objects. As with the example shown in FIG. 5, the image frame specifying the image region is set so as to be in contact with the moving object in the longitudinal direction and in the lateral direction of the coordinate screen.

In Step S6, the cutout image generation portion 114 calculates relative distances in the lateral direction and the longitudinal direction between the respective tracking subjects using the coordinates calculated by the position information extraction portion 112. Herein, let the display screen be the x-y coordinate plane, then the cutout image generation portion 114 calculates the relative distances between the respective moving objects as the tracking subjects according to the distances in the longitudinal direction and the lateral direction between the end points at the particular position (upper left end points) of the image regions specifying the moving objects and the sizes of the respective moving objects. It should be appreciated that the calculation method of the relative distances between the respective moving objects is not limited to the method described above and various other methods are also available. For example, the cutout image generation portion 114 calculates the distance between the coordinates from the x coordinate of the upper left end point of an image region present on the left within the x-y coordinate plane to the x coordinate of the lower right end point of an image region present on the right as the relative distance in the lateral direction. Likewise, the cutout image generation portion 114 calculates the distance between the coordinates from the y coordinate of the upper left end point of an image region present on the upper side within the x-y coordinate plane and the y coordinate of the lower right end point of an image region present on the lower side as the relative distance in the longitudinal direction.

In the example of FIG. 5, the relative distance between the moving object 31 and the moving object 33 can be expressed as a distance between $X_{31}$ and $X_{12}$ as the relative distance in the lateral direction and as a distance between $Y_{11}$ and $Y_{32}$ as the relative distance in the longitudinal direction. It should be appreciated that the relative distances are not limited to those calculated in the manner described above. For example, it may be configured in such a manner that the center points of the respective moving objects are specified and the relative distances are expressed by a distance between the center points in the lateral direction and a distance between the center points in the longitudinal direction.

In Step S7, the cutout image generation portion 114 determines whether the relative distances at least in one of the lateral direction and the longitudinal direction between the respective moving objects calculated in Step S6 are larger than a predetermined threshold value (predetermined value). To be more concrete, the cutout image generation portion 114 compares the relative distances in the lateral direction between the respective tracking subjects with the predetermined threshold value and compares the relative distances in the longitudinal direction between the respective tracking subjects with the predetermined threshold value. The cutout image generation portion 114 then determines whether the relative distances at least in one of the lateral direction and the longitudinal direction are larger than the predetermined threshold value. Herein, the predetermined threshold value can be, for example, a sum value of the distances in the lateral direction of the image regions encompassing the respective tracking subjects in the plane of coordinates or a sum value of the distances in the longitudinal direction of the image regions encompassing the respective tracking subjects. In this case, the cutout image generation portion 114 compares the relative distances in the lateral direction between the respective tracking subjects with a sum value of the distances in the lateral direction of the image regions encompassing the respective tracking subjects and also compares the relative distances in the longitudinal direction of the respective tracking subjects with a sum value of the distances in the longitudinal direction of the image regions encompassing the respective tracking subjects. The cutout image generation portion 114 then determines whether the relative distances at least in one of the lateral direction and the longitudinal direction are larger than the corresponding sum value.

In a case where the cutout image generation portion 114 determines in Step S7 that the relative distances at least in one of the lateral direction and the longitudinal direction between the respective tracking subjects are larger than the predetermined threshold value, the flow proceeds to Step S8. In Step S8, the cutout image generation portion 114 specifies cutout ranges of the respective tracking subjects and supplies the entire image generation portion 113 with the information of the cutout ranges as the angle-of-view information. The entire image generation portion 113 then supplies the cutout image generation portion 114 with images of the cutout ranges cut out from the entire image according to the angle-of-view information supplied from the cutout image generation portion 114. The cutout image generation portion 114 generates cutout images to be displayed on the cutout image display portion 116 by applying predetermined processing to the images of the cutout ranges supplied from the entire image generation portion 113. Herein, the cutout images are enlarged by an arbitrary enlargement ratio, for example, in response to a setting operation by the user. The cutout image generation portion 114 then supplies the cutout image display portion 116 with the generated cutout images. The cutout image display portion 116 displays the cutout images supplied from the cutout image generation portion 114 in different cutout display windows.

In a case where the cutout image generation portion 114 determines in Step S7 that the distances among a plurality of the moving objects at least in one of the lateral direction and the longitudinal direction are equal to or smaller than the predetermined threshold value, the flow proceeds to Step S9. In Step S9, the cutout image generation portion 114 generates one cutout image including all of a plurality of the moving objects from the entire image and supplies the cutout image display portion 116 with the generated cutout image. In Step S9, the cutout image generation portion 114 specifies a cutout range including a plurality of the moving objects and supplies the entire image generation portion 113 with the information of this cutout range as the angle-of-view information. The entire image generation portion 113 supplies the cutout image generation portion 114 with an image of the cutout range cut out from the entire image according to the angle-of-view information supplied from the cutout image generation portion 114. The cutout image generation portion 114 generates a cutout image to be displayed on the cutout image display portion 116 by applying predetermined signal processing to the image of the cutout range supplied from the entire image generation portion 113. Herein, the cutout image is enlarged by an arbitrary enlargement ratio, for example, in response to a setting operation by the user. The cutout image display portion 116 displays the cutout image supplied from the cutout image generation portion 114 in one cutout display window.

The cutout image generation portion 114 is capable of setting the angle of view at the center position between the angle of view of a moving object at the position in the closest proximity to the left end of the entire image and the angle of view of a moving object at the position in the closest proximity to the right end of the entire image as the center position of the cutout image. In this case, for example, given that an image range made up of a×b (a and b are arbitrary natural numbers) dots is the cutout range, then a distance between two points from the center position P2 (Xp2, Yp2) of a moving object at the right end and the center position P1 (Xp1, Yp1) of a moving object at the left end has to be shorter than (a, b).

It should be appreciated, however, that the center point of the cutout range is not necessarily the center between P1 and P2 in the cutout range. In order to make motions of the moving objects in the cutout image smoother, it is preferable to measure an amount of movement and a moving direction (for example, in every 10 frames) and to determine an amount of movement until the next 10 frames step-by-step (for example, in a case where the cutout range has moved by 15 dots or more, the cutout range moves by 20 dots in every frame and moves by 7 dots in every frame otherwise) rather than calculating the center position of the cutout range in every frame and moving the cutout range.

Accordingly, the image region of the cutout image including P1 and P2 moves at a step-wise velocity in the display angle of view made up of a×b dots.

Also, the moving direction of the center portion of the image region of the cutout image is determined depending on whether a plurality of moving objects move in a positive direction or in a negative direction. In a case where a plurality of the moving objects move in the same direction (positive direction), the center position is moved in the same direction. In a case where a plurality of the moving objects move in a different direction (negative direction), the center position is moved in a direction in which the absolute value of an amount of movement is the largest.

In the image processing system 1, in a case where a plurality of moving objects do not move in the same direction and the respective moving objects eventually go out of the display angle of view, a new display region is increased as has been described above. In this case, a new display region of a size of c×d (c and d are arbitrary natural numbers) dots is further prepared.

For example, in a case where the display region of a size of a×b dots for a cutout image including P1 and P2 moves from left to right, the distance between P1 and P2 exceeds (a, b) when P2 starts to move rightward. In this case, the center position of the tracking display is set at P1 and a display region of a size of c×d dots using P2 as the center position of the tracking display is newly prepared. Accordingly, P1 is kept displayed in the display region of a size of a×b dots while P2 is tracked and displayed in the display region of a size of c×d dots.

According to the image processing system 1, as has been described above, even when a moving object has moved and is no longer tracked and displayed in a predetermined image region, it becomes possible to continuously track and display this moving object by newly providing a display region.

Also, according to the image processing system 1, the display positions of moving objects within the display image region are set by setting the left end and the right end on the angle of view of an image region to be displayed for every image frame. In this instance, for a plurality of moving objects, the order of the moving objects from the left or the right can be determined on the basis of a difference of the number of pixels between adjacent moving objects. According to the image processing system 1, for example, moving objects included in the display region of a size of a×b dots are displayed from the right and moving objects that do not fit inside this display region are displayed in a newly prepared display region of a size of c×d dots and the position of the tracking center is calculated for each display angle of view.

Figure 3:
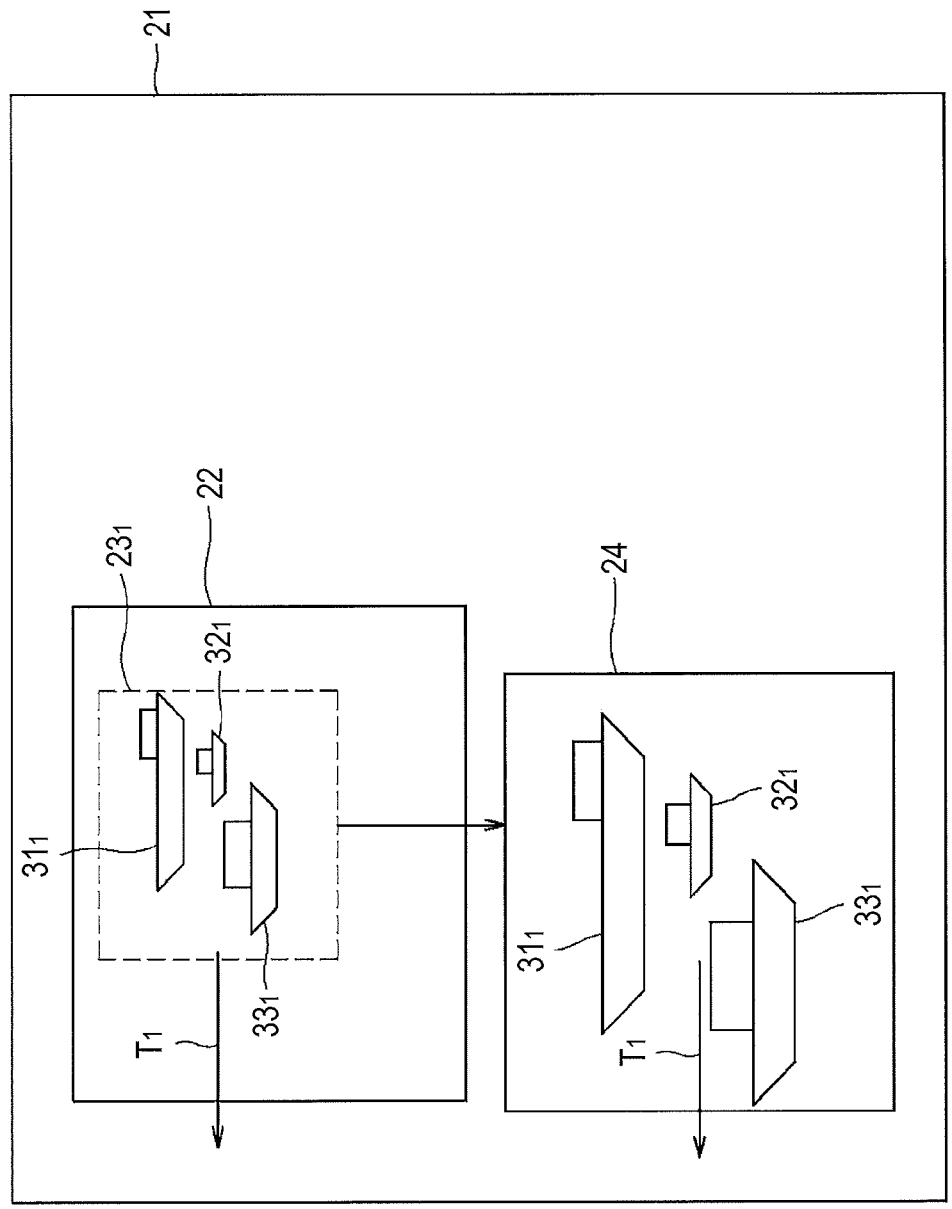
FIG. 3 is a view showing an example of a display screen shown on a display provided to the image processing device.

An example to track and display a plurality of moving objects will now be described. In FIG. 3 described above, moving objects $31_1$, $32_1$, and $33_1$ as the tracking subjects that are tracked and displayed in the entire image display window 22 on the display screen 21 travel in the same direction indicated by an arrow $T_1$ at substantially the same velocity. By repetitively performing the arithmetic processing described above, the cutout image generation portion 114 determines that the relative distances between the respective moving objects $31_1$, $32_1$, and $33_1$ are equal to or smaller than the predetermined threshold value. The cutout image generation portion 114 then specifies a cutout range $23_1$ to display the moving objects $31_1$, $32_1$, and $33_1$ within one cutout image. Subsequently, the cutout image generation portion 114 generates a cutout image of this specified cutout range $23_1$ and supplies the cutout image display portion 116 with the generated cutout image. The cutout image display portion 116 thus displays this cutout image in the cutout image display window 24. In a case where the relative distances between the respective moving objects $31_1$, $32_1$, and $33_1$ as the tracking subjects are equal to or smaller than the predetermined threshold value, the user is able to recognize the moving objects $31_1$, $32_1$, and $33_1$ as a group of moving objects.

Alternatively, a plurality of moving objects may be cut out and displayed, for example, as are shown in FIG. 6 through FIG. 9. For instance, the moving objects $31_2$, $32_2$, and $33_2$ as the tracking subjects to be tracked and displayed in the entire image display window 22 on the display screen 21 shown in FIG. 6 travel in the same direction indicated by an arrow $T_1$. Herein, the travel velocities of the moving object $31_2$ and the moving object $32_2$ are substantially the same. Accordingly, the cutout image generation portion 114 specifies an image region encompassing the moving object $31_2$ by the upper left end point $A_4$ ($X_{41}$, $Y_{41}$) and the lower right end point $B_4$ ($X_{42}$, $Y_{42}$). Also, the moving object $32_2$ is specified by the upper left end point $A_5$ ($X_{51}$, $Y_{51}$) and the lower right end point $B_5$ ($X_{52}$, $Y_{52}$) and the moving object $33_2$ is specified by the upper left end point $A_6$ ($X_{61}$, $Y_{61}$) and the lower right end point $B_6$ ($X_{62}$, $Y_{62}$). The cutout image generation portion 114 determines that the relative distance between the moving objects $31_2$ and $32_2$ is equal to or smaller than the predetermined threshold value. In order to display the moving object $31_2$ and the moving object $32_2$ within one cutout image, the cutout image generation portion 114 sets a cutout range $23_2$ specified by the upper left end point $P_1$ ($X_{101}$, $Y_{101}$) and the lower right end point $Q_1$ ($X_{102}$, $Y_{102}$). The cutout image generation portion 114 then generates a cutout image of the set cutout range $23_2$ and supplies the cutout image display portion 116 with the generated cutout image. The cutout image display portion 116 thus displays the cutout image of this cutout range $23_2$ in a cutout image display window $24_2$. Herein, the travel velocity of the moving object $31_2$ and the moving object $32_2$ and travel velocity of the moving object $33_2$ are different. The cutout image generation portion 114 determines that the relative distance between at least one of the moving object $31_2$ and the moving object $32_2$ and the moving object $33_2$ is larger than the threshold value. The cutout image generation portion 114 then sets a cutout range $23_3$ specified by the upper left end point $P_2$ ($X_{201}$, $Y_{201}$) and the lower right end point $Q_2$ ($X_{202}$, $Y_{202}$).

Subsequently, the cutout image generation portion 114 generates a cutout image of the cutout range $23_3$ including the moving object $33_2$ and supplies the cutout image display portion 116 with the generated cutout image. The cutout image display portion 116 displays the cutout image of this cutout range $23_3$ in the cutout image display window $24_1$.

Figure 7:
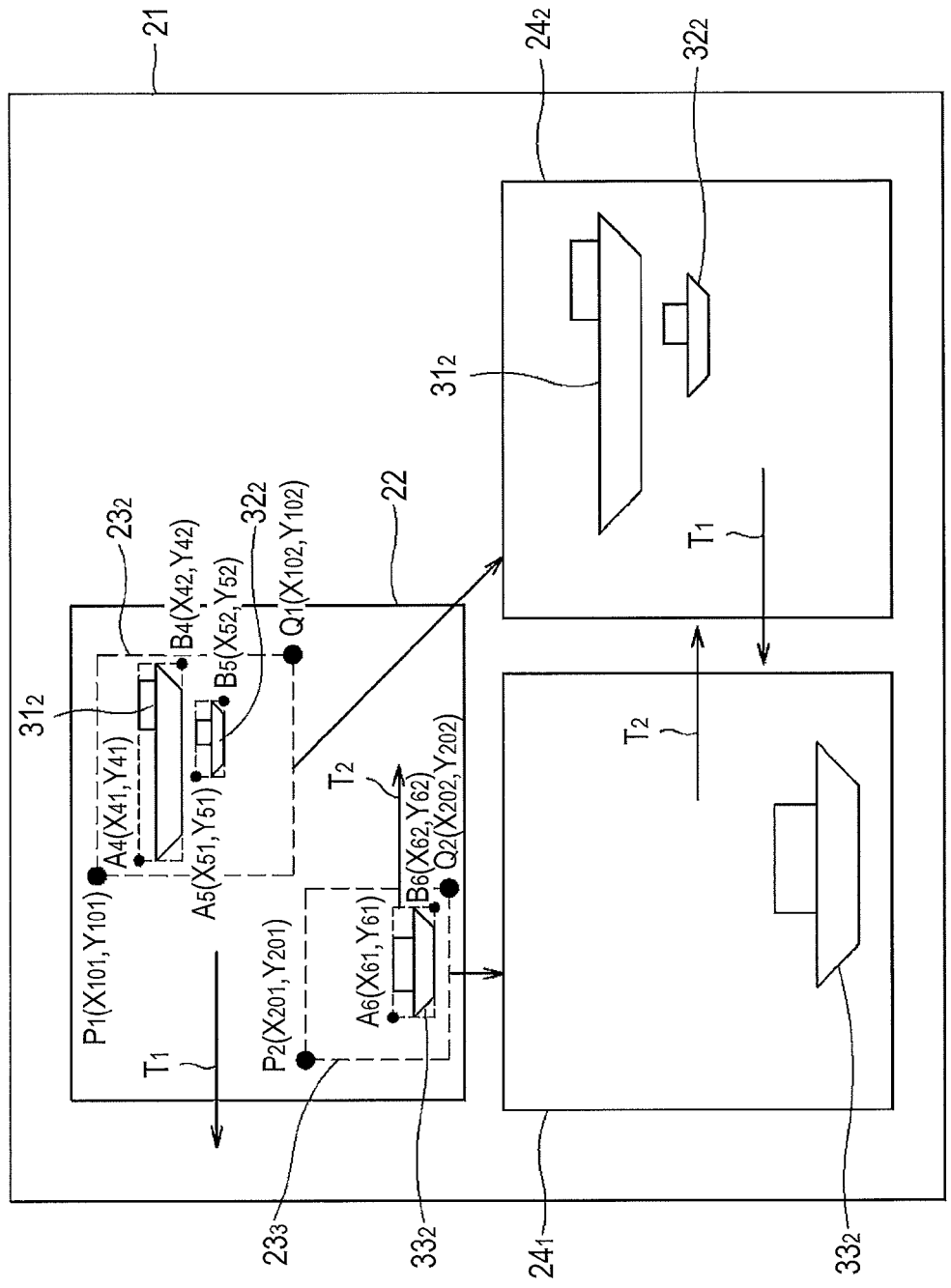
FIG. 7 is a view showing a manner in which a plurality of moving objects are cut out and displayed on a display screen shown on a display provided to the image processing device.
Figure 8:
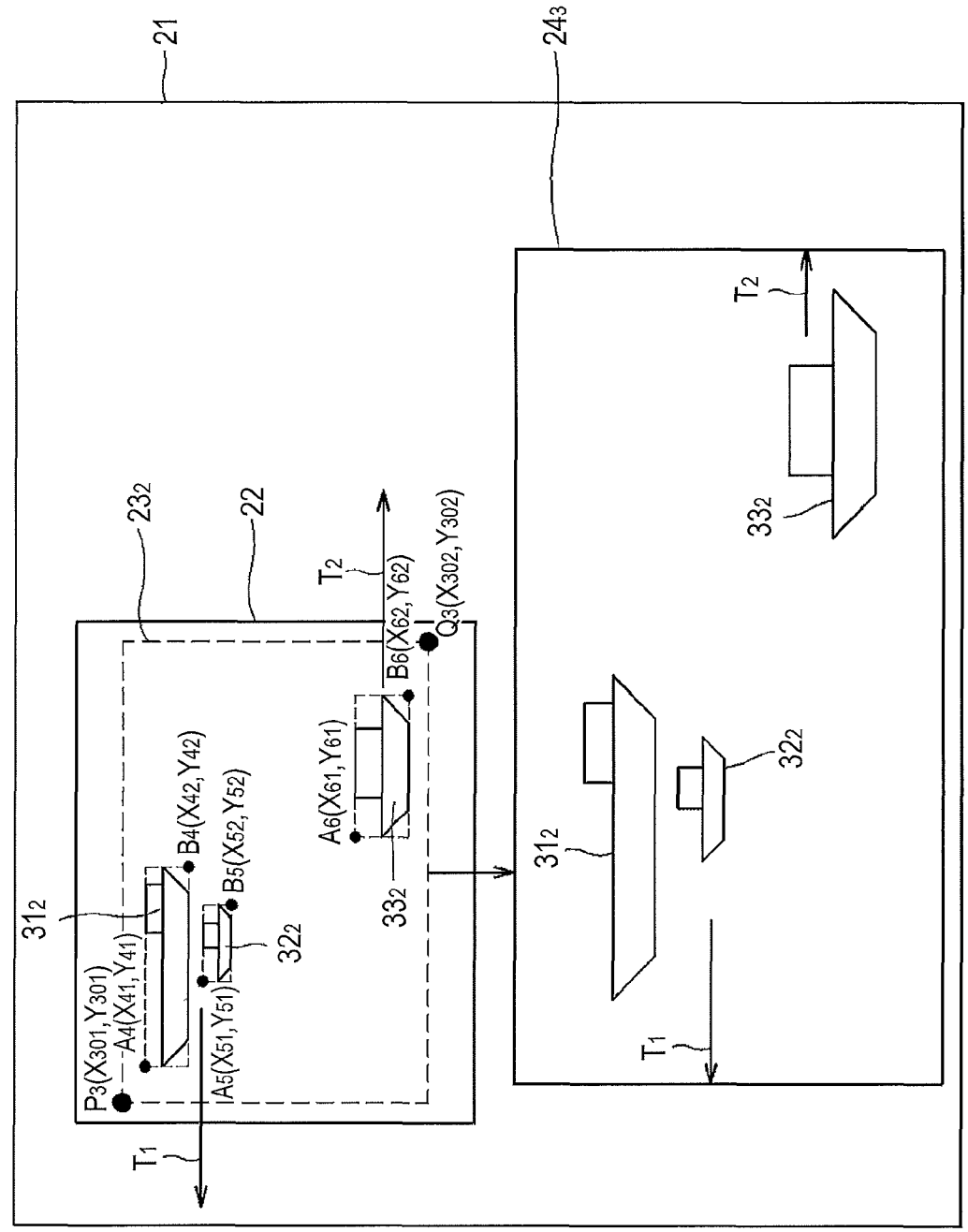
FIG. 8 is a view showing a manner in which a plurality of moving objects are cut out and displayed on a display screen shown on a display provided to the image processing device.
Figure 9:
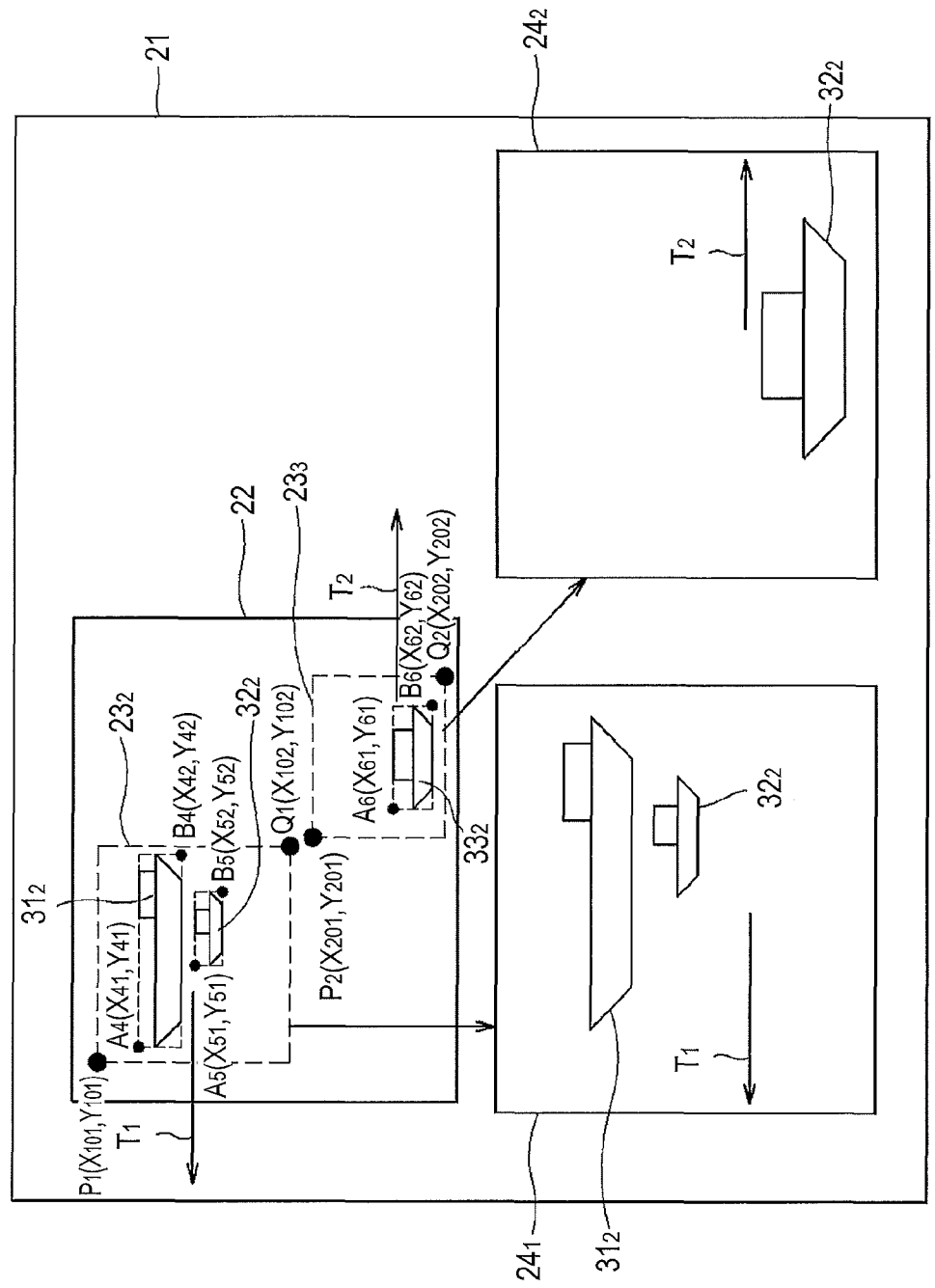
FIG. 9 is a view showing a manner in which a plurality of moving objects are cut out and displayed on a display screen shown on a display provided to the image processing device.

FIG. 7 through FIG. 9 show examples of a case where the moving object $31_2$ and the moving object $32_2$ traveling in the same direction indicated by an arrow $T_1$ and the moving object $33_2$ traveling in a direction (a direction indicated by an arrow $T_2$) opposite to the travel direction of the moving object $31_2$ and the moving object $32_2$ are displayed in the entire image display window 22 on the display screen 21.

In the example shown in FIG. 7, the cutout image generation portion 114 determines that the relative distance between the moving object $31_2$ and the moving object $32_2$ is equal to or smaller than the predetermined threshold value and sets a cutout range $23_2$ specified by the upper left end point $P_1$ ($X_{101}$, $Y_{101}$) and the lower right end point $Q_1$ ($X_{102}$, $Y_{102}$) in order to display the moving object $31_2$ and the moving object $32_2$ within one cutout image. The cutout image generation portion 114 then generates a cutout image of the set cutout range $23_2$ and supplies the cutout image display portion 116 with the generated cutout image. The cutout image display portion 116 thus displays the cutout image of the cutout range $23_2$ in the cutout image display window $24_2$. Also, the cutout image generation portion 114 determines that the relative distance between at least one of the moving object $31_2$ and the moving object $32_2$ and the moving object $33_2$ is larger than the predetermined threshold value. The cutout image generation portion 114 then sets a cutout range $23_3$ specified by the upper left end point $P_2$ ($X_{201}$, $Y_{201}$) and the lower right end point $Q_2$ ($X_{202}$, $Y_{202}$) in order to display the cutout image including the moving object $33_2$ in a cutout image display window different from the cutout image display window $24_2$. The cutout image generation portion 114 then generates a cutout image of the specified cutout range $23_3$ and supplies the cutout image display portion 116 with the generated cutout image. The cutout image display portion 116 thus displays the cutout image of the cutout range $23_3$ in the cutout image display window $24_1$.

Also, as is shown in FIG. 8, when the moving object $31_2$ and the moving object $32_2$ traveling in the direction indicated by an arrow T1 and the moving object $33_2$ traveling in the direction indicated by an arrow $T_2$ come closer to each other, the cutout image generation portion 114 determines that the relative distance between at least one of the moving object $31_2$ and the moving object $32_2$ and the moving object $33_2$ is equal to or smaller than the predetermined threshold value. The cutout image display portion 116 then displays the moving object $31_2$, the moving object $32_2$, and the moving object $33_2$ in a cutout image display window $24_3$ having an enlarged display region.

Assume that the moving object $31_2$ and the moving object $32_2$ traveling in the direction indicated by the arrow $T_1$ and the moving object $33_2$ traveling in the direction indicated by the arrow $T_2$ come closer to each other as is shown in FIG. 8 and then move apart later as is shown in FIG. 9. In this instance, the cutout image generation portion 114 determines that the relative distance between at least one of the moving object $31_2$ and the moving object $32_2$ and the moving object $33_2$ is larger than the predetermined threshold value. Accordingly, the cutout image display portion 116 displays the moving object $31_2$ and the moving object $32_2$ in the cutout image display window $24_1$ and also displays the moving object $33_2$ in the cutout image display window $24_2$.

Figure 10:
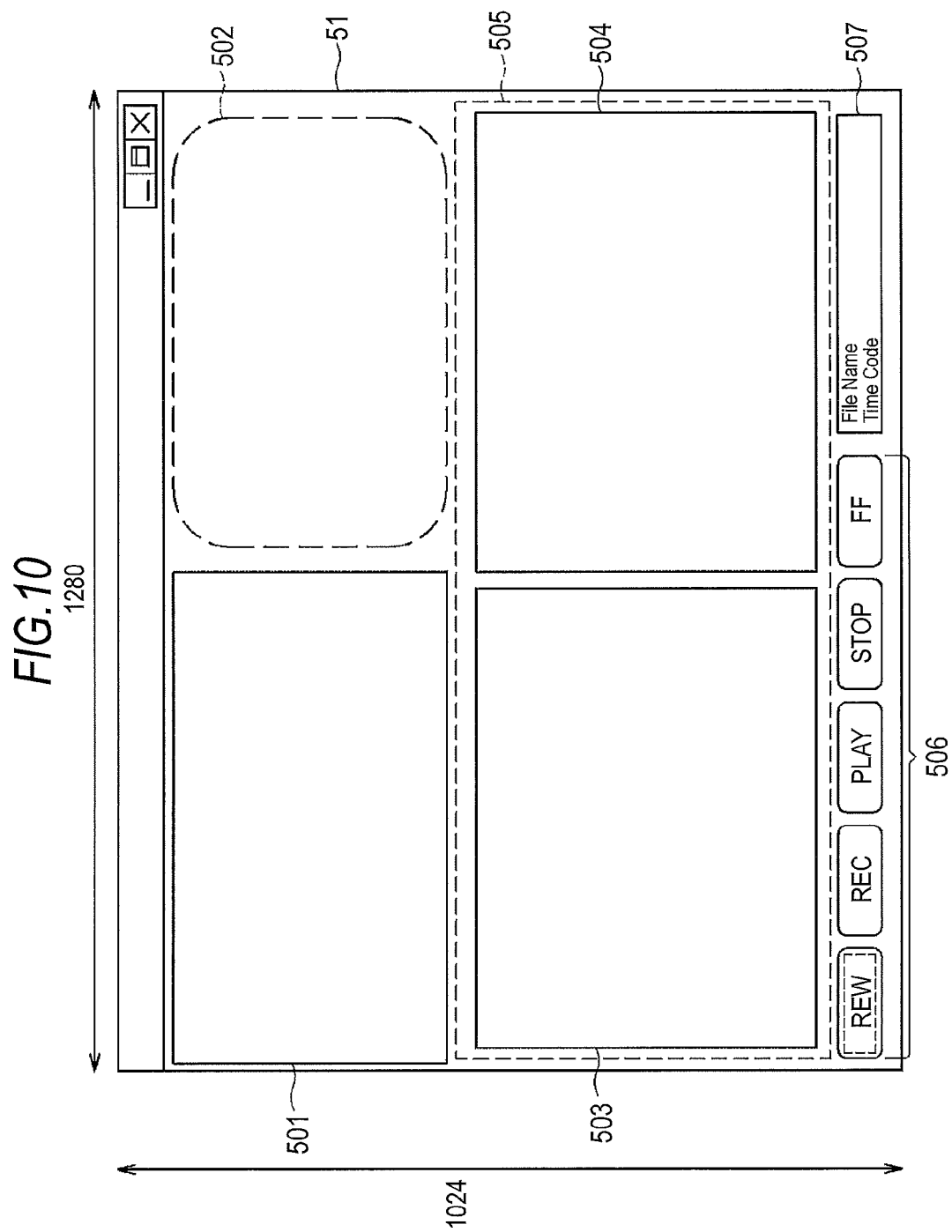
FIG. 10 is a view showing a display screen at SXGA of 1280×1024 dots.

An example of the moving object tracking display by the image processing system 1 will now be described. FIG. 10 shows a display screen 51 at SXGA of 1280×1024 dots. The display screen 51 has an entire image display region 501 as a entire image display window, a camera control panel 502, and a first detailed image display region 503, a second detailed image display region 504, and a maximum display region 505 as cutout image display windows. The display screen 51 also has an operation button 506 including a REW (rewind) button, a REC (record) button, a PLAY (play) button, a STOP (stop) button, and an FF (fast forwarding) button for each image being displayed, and a display portion 507 on which a file name and a time code are displayed.

The entire image display region 501 is a display region made up of 640×360 dots and it is a region in which tracking subjects are displayed. Both of the first detailed image display region 503 and the second detailed image region display region 504 are regions made up of 600×450 dots. The maximum display region 505 is a region made up of 1250×480 dots.

In a case where a plurality of tracking subjects are displayed in the entire image display region 501, a plurality of the tracking subjects determined as having the relative distances between the respective tracking subjects larger than the predetermined threshold value are divided, so that a plurality of the tracking subjects are enlarged and displayed in the first detailed image display region 503 and the second detailed image display region 504.

Also, in a case where a plurality of tracking subjects are displayed in the entire image display region 501, a plurality of the tracking subjects determined as having the relative distances between the respective tracking subjects equal to or smaller than the predetermined threshold value are displayed in the maximum display region 505.

The camera control panel 502 has operations buttons to control the camera portion 10, for example, buttons for zoom, focus, iris (diaphragm), shutter, gain, brightness (luminance), white balance, pan, and tilt control.

Figure 11:
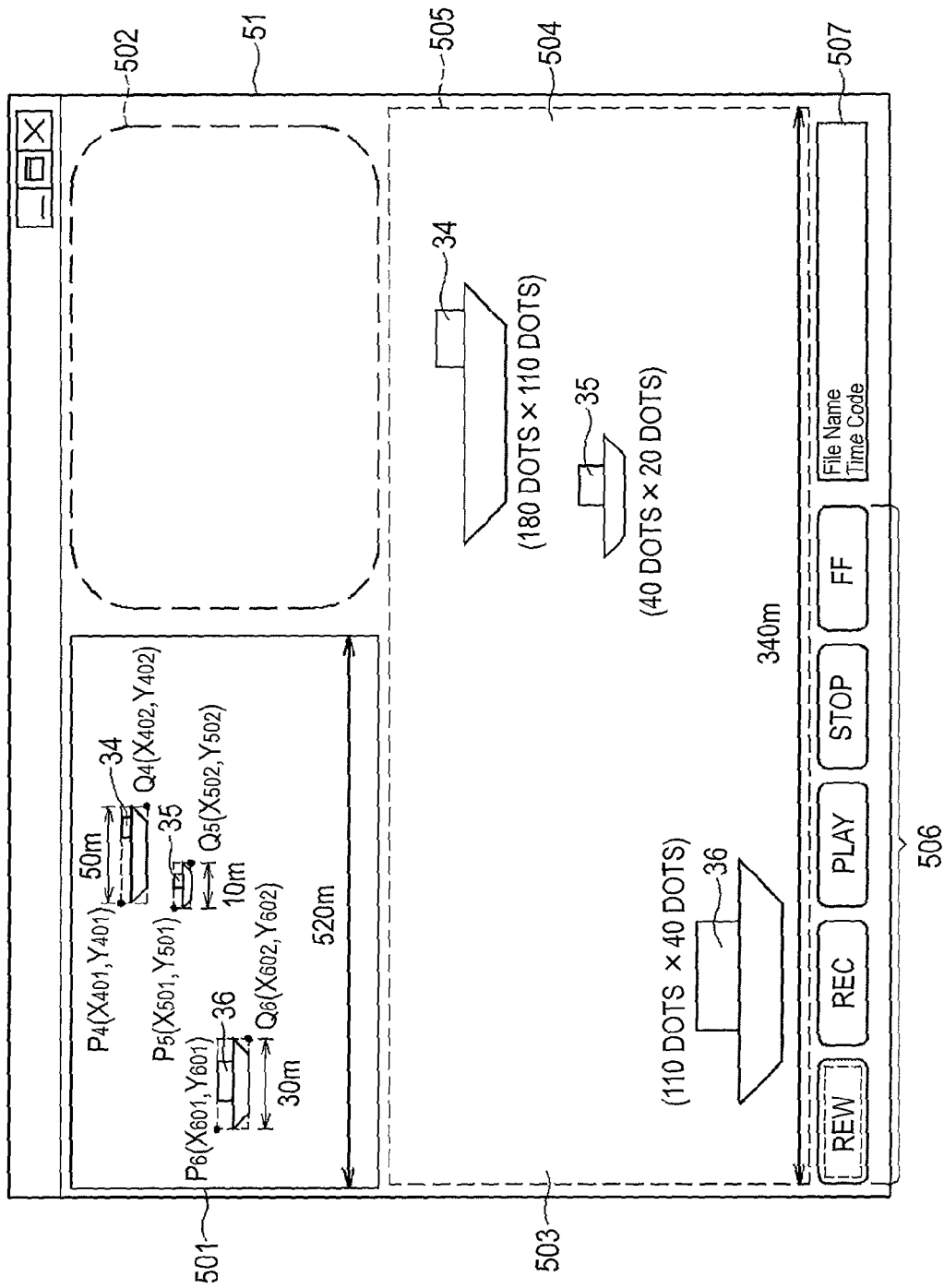
FIG. 11 is a view showing an example of a display screen on which tracking subjects imaged by an HD camera are displayed.
Figure 12:
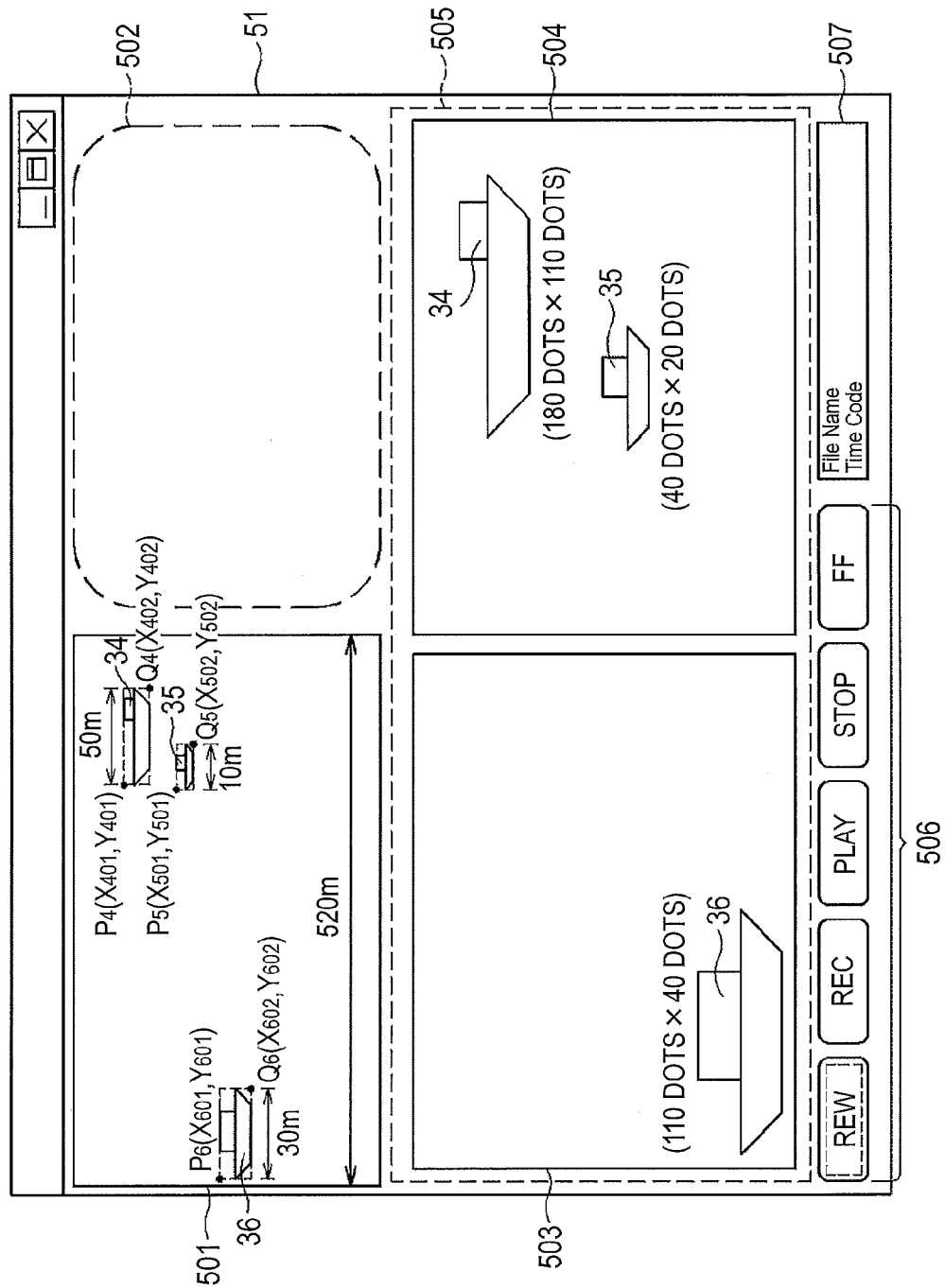
FIG. 12 is a view showing an example of a display screen on which tracking subjects imaged by an HD camera are displayed.
Figure 13:
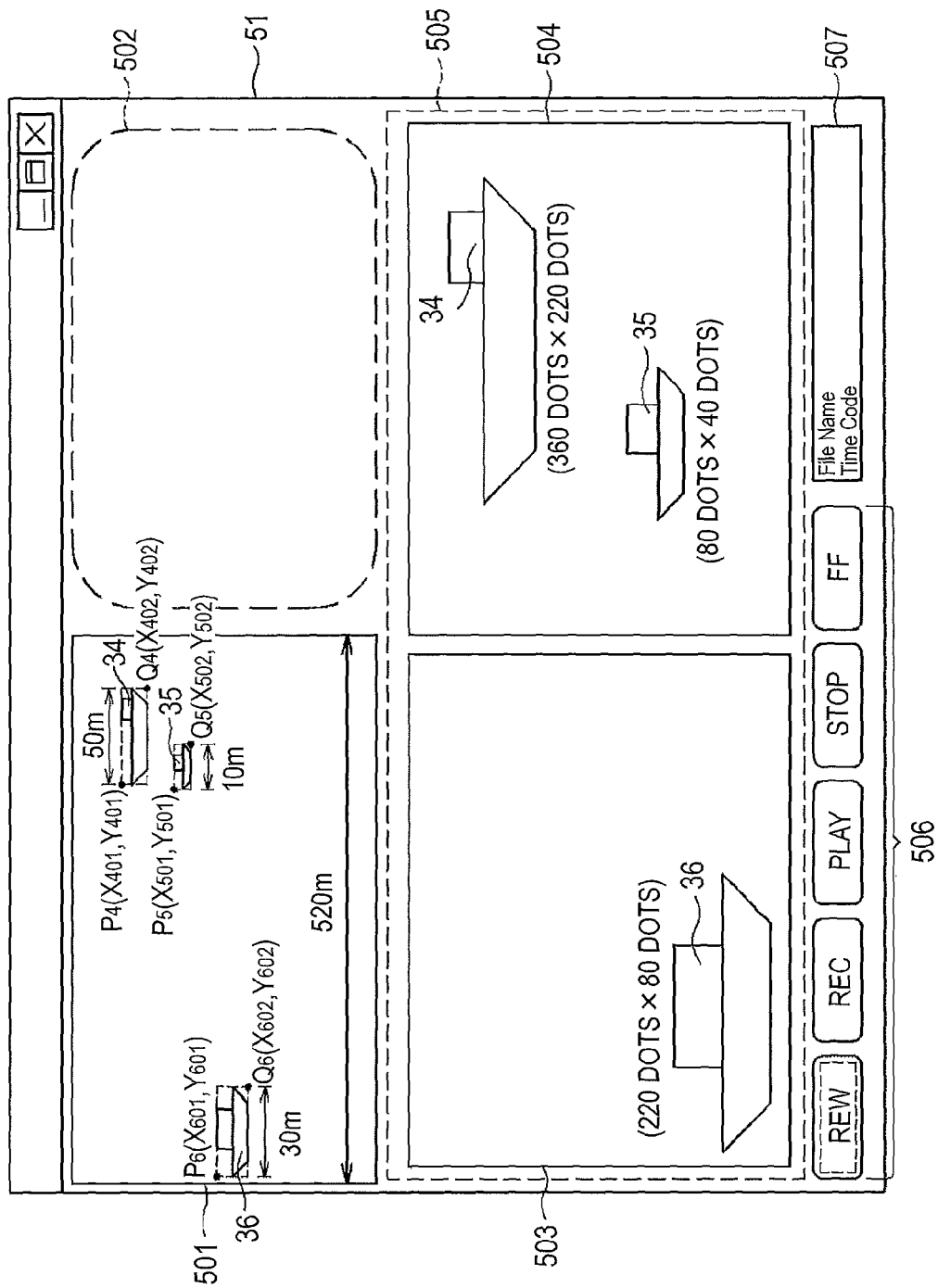
FIG. 13 is a view showing an example of a display screen on which tracking subjects imaged by an HD camera are displayed.

FIG. 11 through FIG. 13 are views showing examples of a display screen showing moving objects 34, 35, and 36 present about 3 km ahead the position of the camera portion 10 and captured by the camera portion 10 formed of an HD camera having output pixels at 1920×1080 dots and set at the angle of view of 10 degrees.

FIG. 11 is a view showing a display screen 51 showing a region having a horizontal width of 520 m and including the moving objects 34 through 36 as tracking subjects having horizontal widths of 50 m, 10 m, and 30 m, respectively, in the entire image display region 501. In the example shown in FIG. 11, the horizontal width of 340 m is given as the predetermined threshold value. The moving objects 34 through 36 are included completely within an image region having the horizontal width of 340 m. More specifically, in the entire image display region 501, a distance between $X_{601}$, which is the x coordinate of the upper left end point $P_6$ specifying the moving object 36 at the leftmost position, and $X_{402}$, which is the x coordinate of the lower right end point $Q_4$ specifying the moving object 34 at the rightmost position, represents a distance 340 m or less.

The cutout image generation portion 114 generates a cutout image (detailed image) of the same pixel size, which is an image region having the horizontal width of 340 m to completely include the moving objects 34 through 36 and cut out from the entire image display region 501, and supplies the cutout image display portion 116 with this cutout image. The cutout image display portion 116 thus displays the cutout image supplied from the cutout image generation portion 114 in the maximum display region 505.

There is a case where none of the moving objects are completely included in the image region having the horizontal width of 340 m in the entire image display region 501. In an example shown in FIG. 12, none of the moving objects 34 through 36 are completely included in the image region having the horizontal width of 340 m when cut out from the entire image display region 501. More specifically, in the entire image display region 501, a distance between $X_{601}$, which is the x coordinate of the upper left endpoint $P_6$ specifying the moving object 36 at the leftmost position, and $X_{402}$, which is the x coordinate of the lower right endpoint $Q_4$ specifying the moving object 34 at the rightmost position, represents a distance exceeding 340 m.

The cutout image generation portion 114 specifies a cutout range including the moving object 36 from the entire image display region 501 and generates a cutout image for the moving object 36 to be displayed in the first detailed image display region 503. Also, the cutout image generation portion 114 specifies a cutout range including the moving objects 34 and 35 and generates a cutout image for the moving objects 34 and 35 to be displayed in the second detailed image display region 504. The cutout image display portion 116 then displays the cutout image including the moving object 36 in the first detailed image display region 503 and also displays the cutout image including the moving objects 34 and 35 in the second detailed image display region 504.

Also, in an example shown in FIG. 13, all of the moving objects 34 through 36 are completely included within a region having a horizontal width of 520 m. Herein, the user is able to set the digital ×2 zoom in the imaging mode of the camera portion 10 formed of an HD camera when detailed images are displayed. Herein, in a case where a distance between $X_{601}$ and $X_{402}$ in the entire image display region 501 exceeds a horizontal width of 260 m, the cutout image display region 116 displays the moving object 36 in the first detailed image display region 503 and also displays the moving objects 34 and 35 in the second detailed image display region 504.

Figure 14:
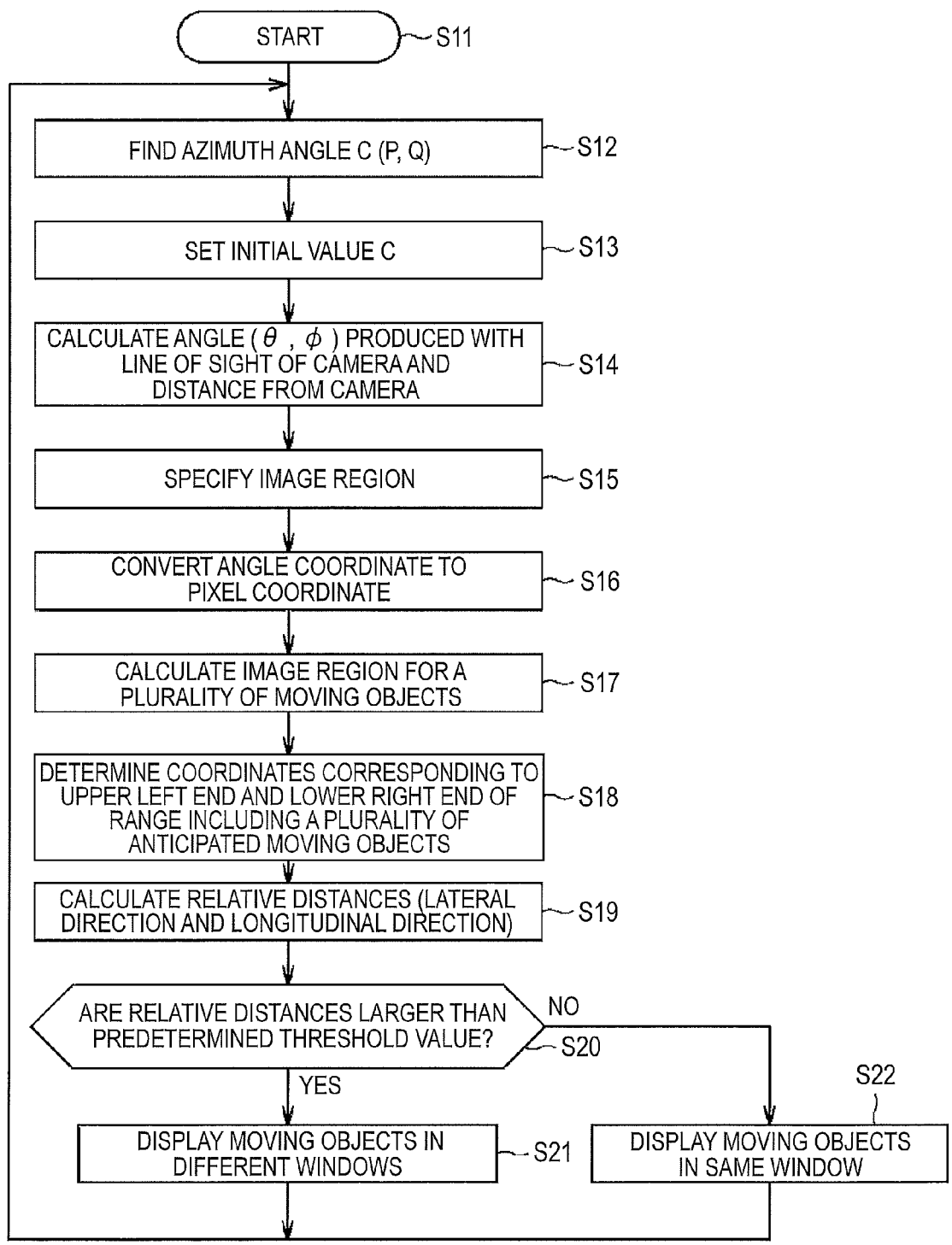
FIG. 14 is a flowchart used to describe a moving object tracking and displaying processing operation according to latitude and longitude information.

FIG. 14 is a flowchart used to describe a moving object tracking and displaying processing operation according to latitude and longitude information by the image processing system 1. This moving object tracking and displaying processing according to the latitude and longitude information is suitable to a case where a captured image is a still image.

In Step S11, the position information extraction portion 112 starts the moving object tracking and displaying processing according to the latitude and longitude information.

Figure 15:
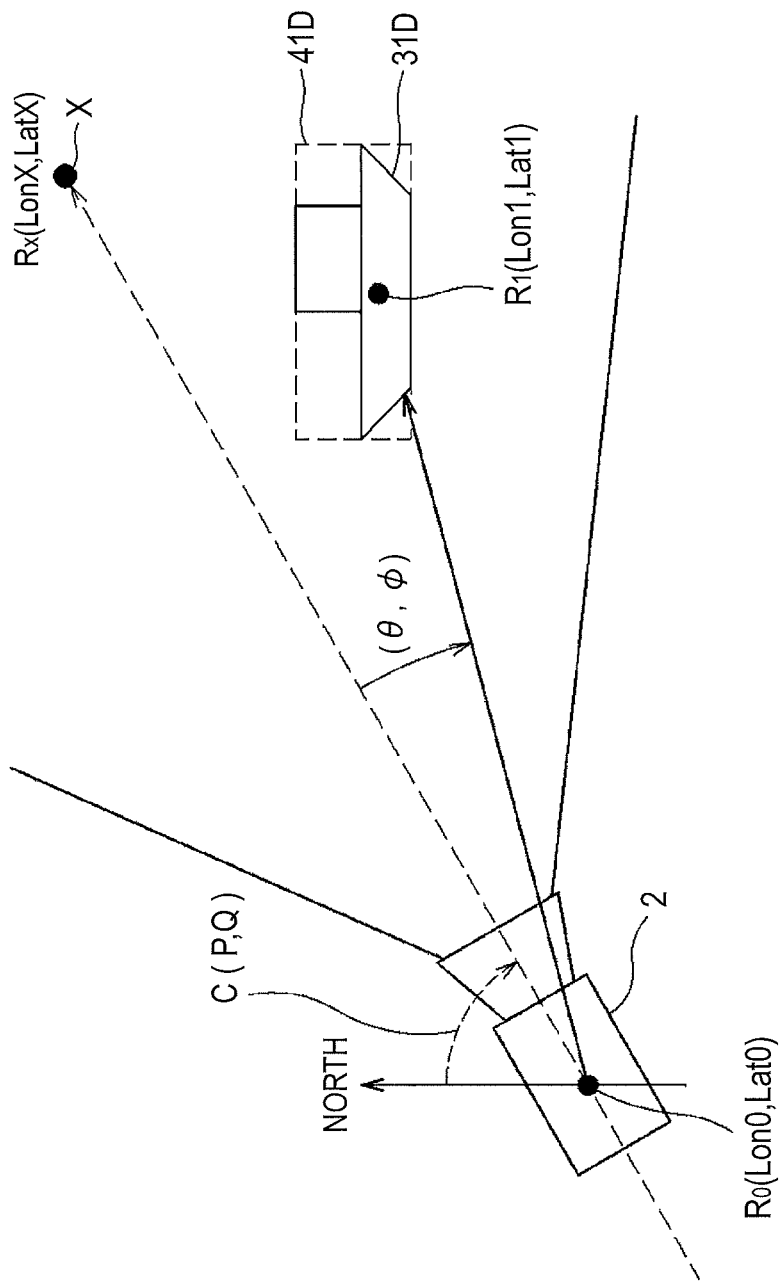
FIG. 15 is a view showing the positional relation among the image transmission device, a reference subject, and a moving object.

In Step S12, the position information extraction portion 112 calculates the positions of the image transmission device 2 and a reference subject X according to the latitude and the longitude in the image frame supplied from the data reception portion 111, for example, as is shown in FIG. 15. The installment position of the image transmission device 2 is expressed by the center position $R_0$ (Lon0, Lat0) of the image transmission device 2. The center position $R_x$ of the reference subject X is expressed by $R_x$ (LonX, LatX). Also, in Step S12, the position information extraction portion 112 calculates the azimuth angle C (P, Q) using P [dg] and Q [deg] in such a manner that the image transmission device 2 falls on the origin of the line of sight to the center position $R_x$ (LonX, LatX) of the reference subject X.

Figure 16:
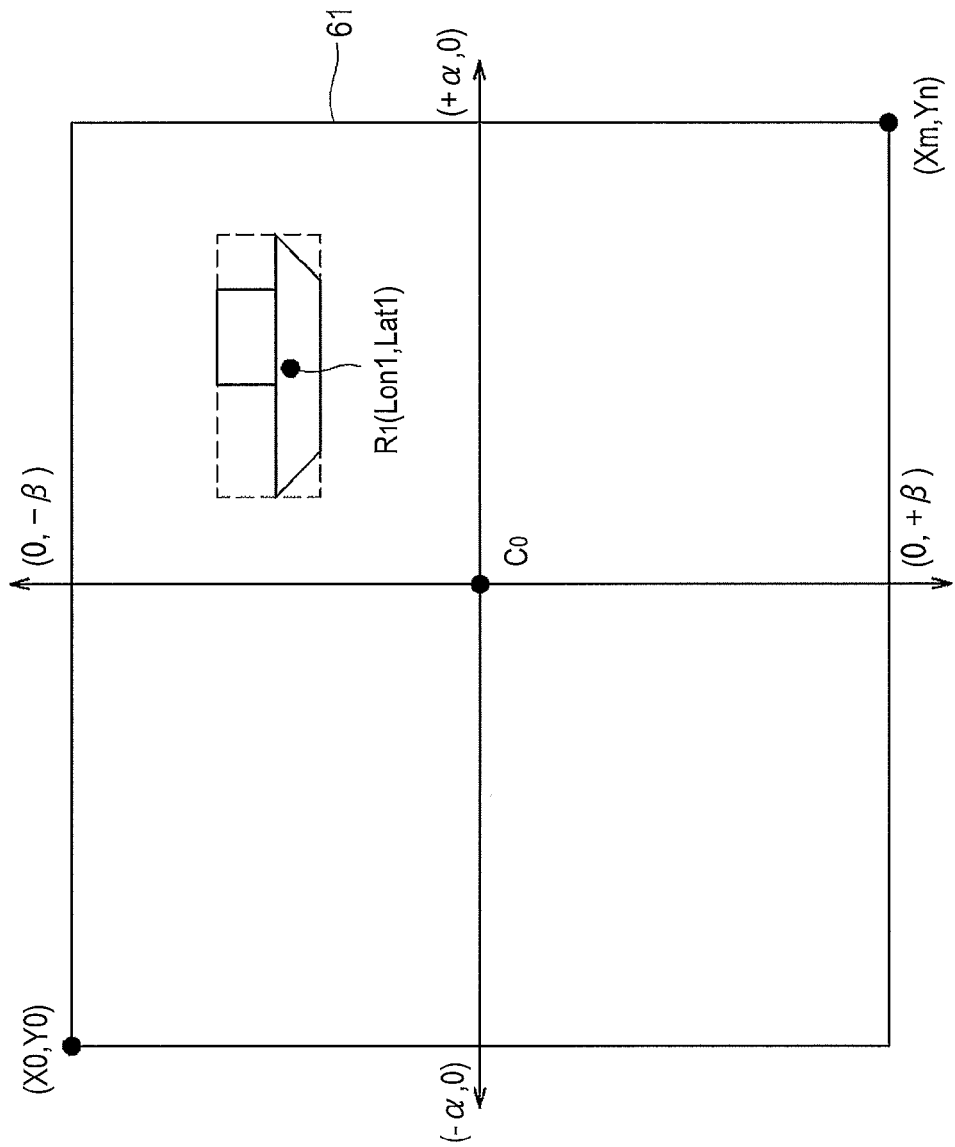
FIG. 16 is a view showing an entire image display window displayed by the image transmission device.

In Step S13, as is shown in FIG. 16, the position information extraction portion 112 sets the pixel value and an origin $C_0$ as an initial value so as to fall on the center of the horizontal and vertical angles of views in an entire image display window 61 displayed by the image processing device 3. The origin $C_0$ (0, 0) is calculated in accordance with C (P, Q)=C (m/2, n/2).

In Step S14, the position information extraction portion 112 calculates an angle (θ, φ) produced between the line of sight of the image transmission device 2 to the center position $R_x$ of the reference subject X and a direction from the image transmission device 2 to the center position $R_1$ of a moving object 31D. The position information extraction portion 112 calculates a distance from the image transmission device 2 to the center position $R_1$ of the moving object 31D using the center position $R_0$ (Lon0, Lat0) of the image transmission device 2 and the center position $R_1$ (Lon1, Lat1) of the moving object 31D.

In Step S15, the position information extraction portion 112 specifies an image region 41D of an image including the moving object 31D on the basis of the angle (θ, φ) produced between the line of sight of the image transmission device 2 and the direction from the image transmission device 2 to the center position $R_1$ of the moving object 31D and the distance from the image transmission device 2 to the center position $R_1$ of the moving object 31D calculated in Step S14. The image region 41D specified by the position information extraction portion 112 is not limited to a case where it is specified so that the region frame is in contact with the moving object 31D as is shown in FIG. 15. It may be configured in such a manner that the position information extraction portion 112 specifies the image range 41D as a small region so that the moving object 31D will be displayed large, for example, in a case where a distance from the image transmission device 2 to the moving object 31D is long. Alternatively, it may be configured in such a manner that the position information extraction portion 112 specifies the image region 41D as a large region so that the moving object 31D is displayed small, for example, in a case where a distance from the image transmission device 2 to the moving object 31D is short.

In Step S16, the position information extraction portion 112 performs processing to covert the angular coordinate to the pixel coordinate in order to display the image of the image region 41D calculated in Step S15 in the cutout image display window.

In Step S17, the position information extraction portion 112 applies calculation processing in the same manner as in Step S12 through Step S16 to a plurality of moving objects and specifies image regions of moving objects as tracking subjects.

In Step S18, the position information extraction portion 112 performs calculation processing of the coordinates (x, y) of the upper left end point and the lower right end point in an image region of an image including the moving objects in a plurality of continuous image frames obtained in the past and stored in a buffer (not shown) provided to the image processing device 3. The position information extraction portion 112 then calculates moving velocities of the respective moving objects in the image frame using the calculated coordinates (x, y) of the upper left end point and the lower right end point in the image frames in the past. Subsequently, the position information extraction portion 112 calculates the predicted values of the coordinates (x, y) of the upper left end point and the lower right end point of the image region including the moving objects in the following image frame supplied from the date reception portion 111. Accordingly, the position information extraction portion 112 specifies the coordinates of the upper left end point and the lower right end point of the image region including a plurality of anticipated moving objects.

In Step S19, the cutout image generation portion 114 calculates relative distances in the longitudinal direction and the lateral direction between the respective moving objects among a plurality of the moving objects on the basis of the coordinate values specified by the position information extraction portion 112.

In Step S20, the cutout image generation portion 114 determines whether the relative distances at least in one of the lateral direction and the longitudinal direction between the respective moving objects calculated in Step S19 are larger than a predetermined threshold value. In a case where the cutout image generation portion 114 determines in Step S20 that the relative distances at least in one of the lateral direction and the longitudinal direction are larger than the predetermined threshold value, the flow proceeds to Step S21. In Step S21, the cutout image generation portion 114 specifies cutout ranges to display the respective moving objects in different cutout image display windows. The cutout image generation portion 114 then generates cutout images of the specified cutout ranges and supplies the cutout image display portion 116 with the generated cutout images. The cutout image display portion 116 thus displays the cutout images of the specified cutout ranges in different cutout image display windows. Also, in a case where the cutout image generation portion 114 determines in Step S20 that the relative distances at least in one of the lateral direction and the longitudinal direction between the respective moving objects are equal to or smaller than the predetermined threshold value, the flow proceeds to Step S22. In Step S22, the cutout image display portion 116 displays the cutout image including a plurality of the moving objects in one cutout image display window according to the information of the cutout range supplied from the cutout image generation portion 114.

According to the image processing system 1 performing the processing as above, by displaying a plurality of tracking subjects in the entire image display window and the cutout image display window(s), it becomes possible to obtain detailed images of the tracking subjects that have not been obtained by the wide angle imaging while keeping track of the positional relation among the tracking subjects.

Also, according to the image processing system 1, even in a case where a plurality of tracking subjects are not displayed in one cutout image display window, it becomes possible to display a plurality of the tracking subjects in a plurality of cutout image display windows by specifying the cutout ranges of the respective tracking subjects.

Also, according to the image processing system 1, in a case where the relative distances among a plurality of the tracking subjects are equal to or smaller than the predetermined threshold value, it becomes possible to track a plurality of the tracking subjects as a group by displaying all the tracking subjects in one cutout image display window. Accordingly, even when there are a large number of tracking subjects, it becomes possible to keep track of the tracking subjects precisely according to the positional relation among the tracking subjects being displayed in the entire image display window.

Also, according to the image processing system 1, for example, even in a case where a plurality of tracking subjects cross with each other and it becomes difficult to image a given moving object hidden behind another moving object, it becomes possible to cut out and display this hidden tracking subject according to the positions of the moving object in image frames in the past.

An image processing system according to another embodiment to which the present invention is applied will now be described. In the image processing system according to another embodiment of the present invention, a single image transmission device on which the swivel base is mounted generates a panoramic entire image by joining images obtained by swiveling in the lateral direction and in the longitudinal direction by one screen. Alternatively, it generates a panoramic entire image by imaging continuous regions using a plurality of image transmission devices and joining the generated images.

Figure 17:
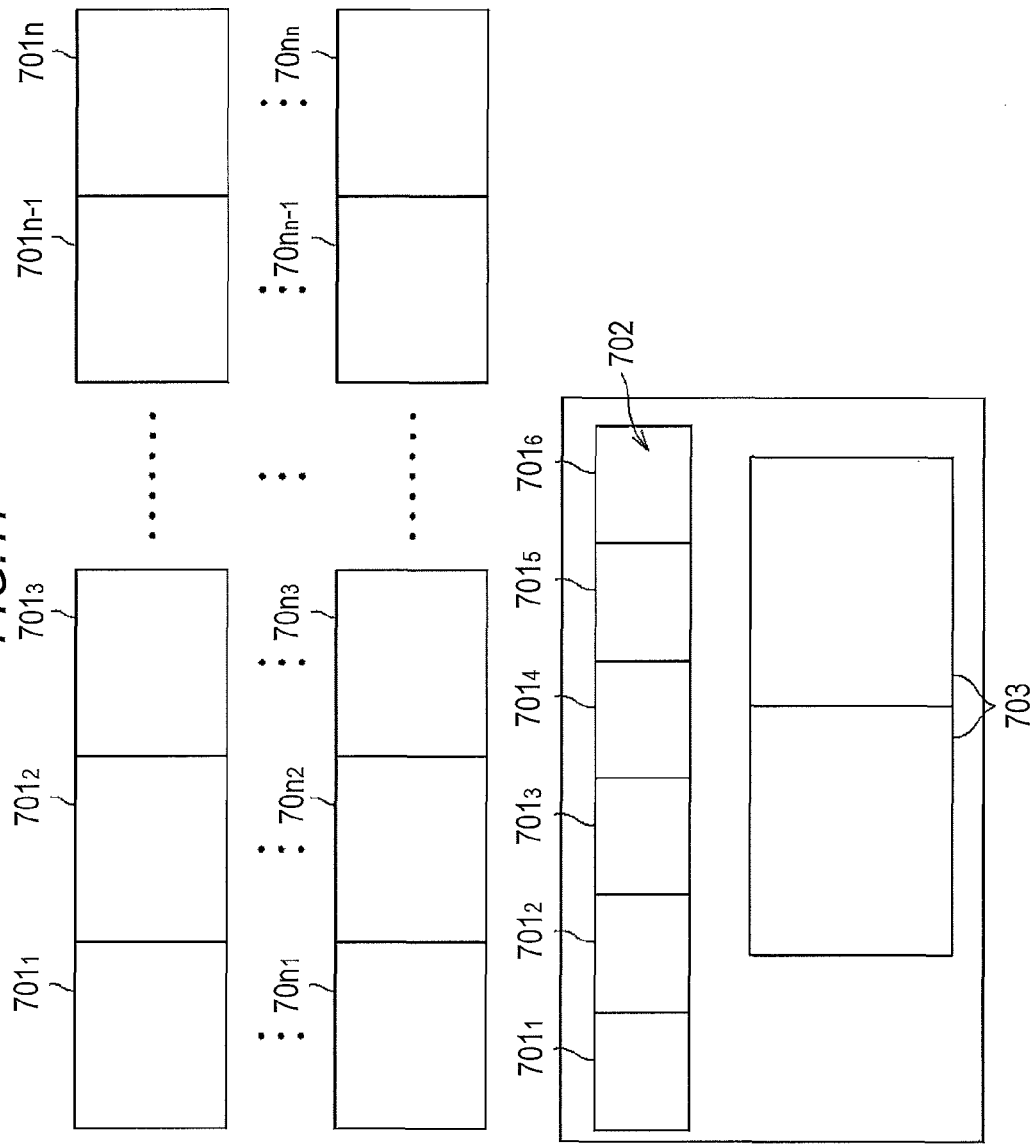
FIG. 17 is a view showing a manner in which a predetermined number of continuous images among a plurality of generated images are displayed in the entire image display window and an image of a predetermined cutout range in the image being displayed in the entire image display window is displayed in a cutout image display window.

In the image processing system according to another embodiment of the present invention, for example, as is shown in FIG. 17, of a plurality of generated images (images $701_1$, $701_2$, $701_3$, . . . , $701_{n-1}$, $701_n$, . . . , $70n_1$, $70n_2$, $70n_3$, . . . , $70n_{n-1}$, and $70n_n$), a predetermined number of continuous images (for example, images $701_1$, $701_2$, $701_3$, $701_4$, $701_5$, and $701_6$) are displayed in an entire image display window 702. Also, images of predetermined cutout ranges in the images being displayed in the entire image display window 702 are displayed in the cutout image display window 703.

In the image processing system according to another embodiment of the present invention, tracking subjects are tracked and displayed in the panoramic entire image as above. With the image processing system according to another embodiment of the present invention, it becomes possible to track and display a moving object that disappears from an image captured by a single camera portion.

Figure 18:
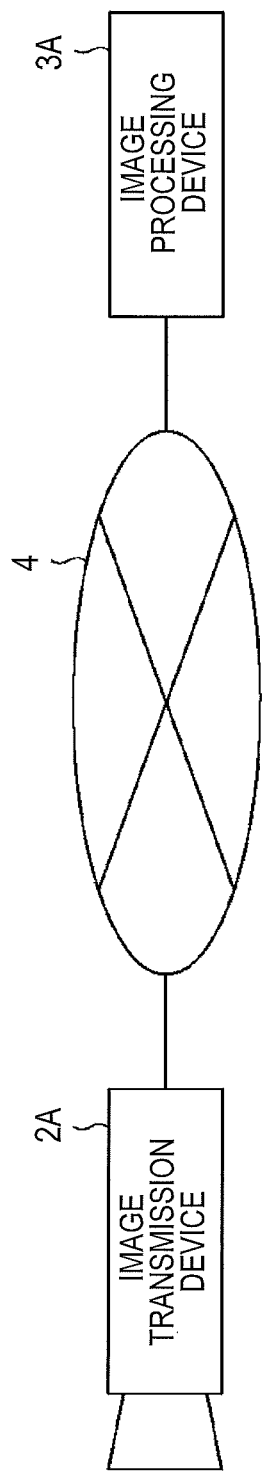
FIG. 18 is a view showing the configuration of an image processing system according to another embodiment to which the present invention is applied.

FIG. 18 is a view showing the configuration of an image processing system 200 according to another embodiment to which the present invention is applied. In the image processing system 200, components same as those of the image processing system 1 are labeled with the same reference numerals and detailed descriptions are omitted herein. As is shown in FIG. 18, the image processing system 200 includes an image transmission device 2A and an image processing device 3A connected to each other via a network 4.

Figure 19:
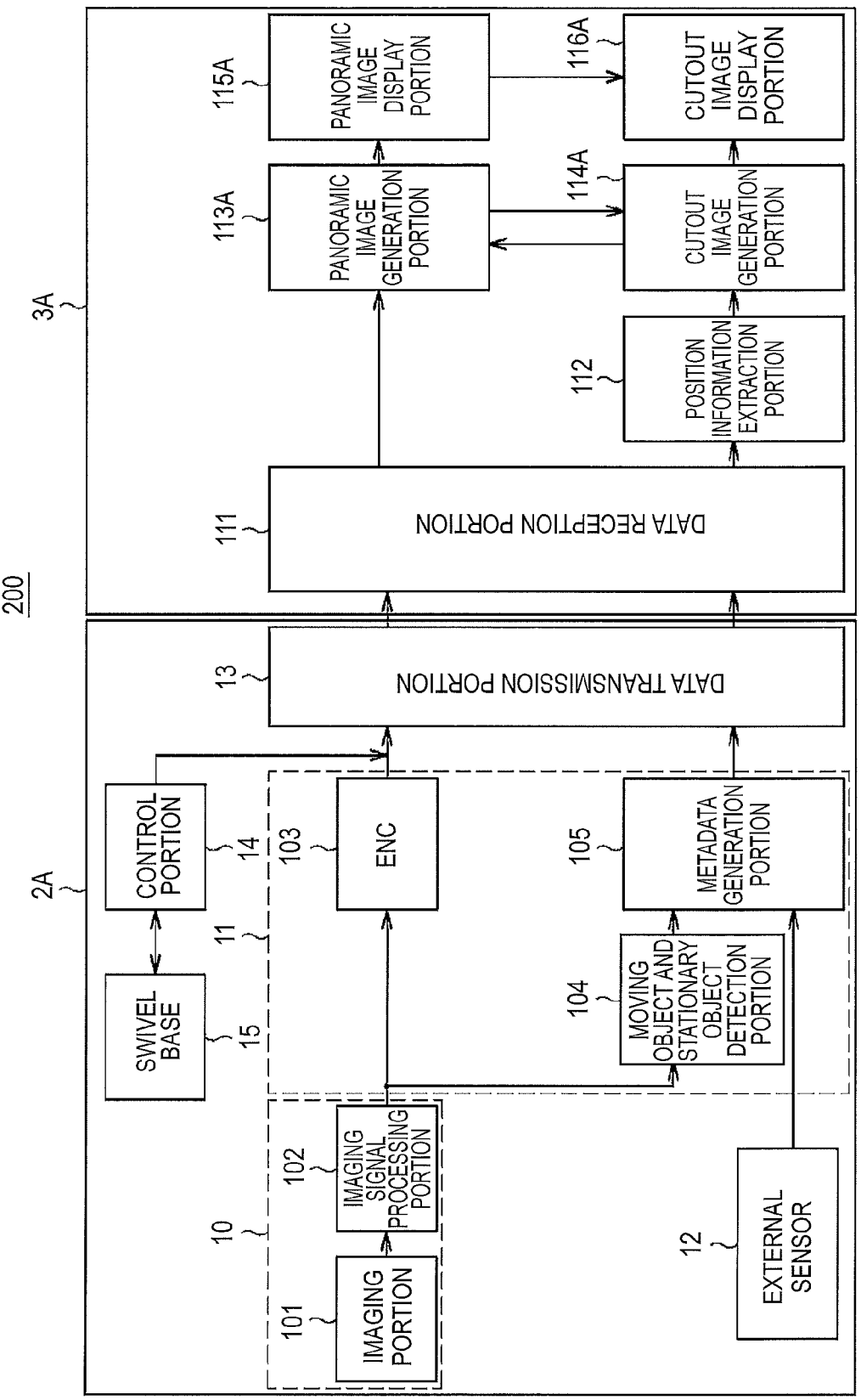
FIG. 19 is a view showing the internal configuration of an image transmission device and an image processing device.

FIG. 19 is a view showing the internal configuration of the image transmission device 2A and the image processing device 3A. As is shown in FIG. 19, in addition to the configuration of the image transmission device 2, the image transmission device 2A further includes a swivel base 15 and a control portion 14 that controls the swivel base 15.

The swivel base 15 has the camera portion 10 mounted thereon and swivels in the lateral direction and the longitudinal direction by one screen under the control of the control portion 14. The control portion 14 supplies the data transmission portion 13 with position information of the swivel base 15. The camera portion 10 captures continuous images per screen according to a swivel operation of the swivel base 15 controlled by the control portion 14. In this case, the control portion 14 controls a moving distance per pulse of the camera portion 10 in association with the movement of the swivel base 15 according to the angle information.

The pulse value on the basis of the swivel angle of view of the camera portion 10 and the moving distance of the swivel base 15 is set in such a manner that the center of the swivel angle of view of the camera portion 10 falls on the origin (0, 0).

The imaging signal processing portion 102 appends position information of the swivel base 15 when the center position of an image is captured to image data of the image captured by the imaging portion 101. The imaging signal processing portion 102 supplies the encoder 103 and the moving object and stationary object detection portion 104 with the image data appended with the position information of the swivel base 15. The image transmission device 2A then transmits the image data appended with the position information of the swivel base 15 to the image processing device 3A.

Although it is not shown in the drawing, the image processing device 3A includes a CPU, a working RAM, a ROM that stores an image processing program according to one embodiment of the present invention, data, and so forth. By running the image processing program on the CPU, a series of the processing is performed by the image processing device 3A.

A panoramic image generation portion 113A provided to the image processing device 3A performs decoding processing of the image data received from the image transmission device 2A via the data reception portion 111 and generates a panoramic entire image using the decoded image data. Subsequently, the panoramic image generation portion 113A supplies a panoramic image display portion 115A and a cutout image generation portion 114A with the generated panoramic entire image. The panoramic image generation portion 113A performs processing to join image data received from the image transmission device 2A and generates a panoramic entire image by reducing the joined images later. Alternatively, it may be configured in such a manner that the panoramic image generation portion 113A performs processing to reduce a plurality of items of image data received from the image transmission device 2A first and then generates a panoramic entire image by joining a plurality of items of reduced image data. The panoramic image generation portion 113A then supplies the cutout image generation portion 114A and the panoramic image display portion 115A with the generated panoramic entire image.

The position information extraction portion 112 extracts position information of moving objects in the image by performing predetermined arithmetic processing on the basis of the image data supplied from the data reception portion 111 and metadata as detection information of the moving objects and the stationary objects. It may be configured in such a manner that the position information extraction portion 112 takes in the position information of the moving objects from the outside, such as the GPS, and converts the position information of the moving objects to the position information in the image.

The position information extraction portion 112 is capable of calculating a distance between two points, for example, in accordance with the Hubeny's distance formula expressed by Mathematical. Expression (1) below from two points whose latitude and longitude are specified by the GPS:

$$D = \mathrm{sqrt}((M*dP)*(M*dP) + (N*\cos(P)*dR)*(N*\cos(P)*dR)) \quad (1)$$

where D is a distance between two points (m), P is a mean latitude of two points (radian), dP is a difference in latitude between two points, dR is a difference in longitude between two points, M is a meridian radius of curvature, and N is a prime vertical radius of curvature.

Also, a calculation method of a distance between two points specified by the GPS may be referred to "TOTAL INVERSE SOLUTIONS FOR THE GEODESIC AND GREAT ELLIPTIC", B. R. Bowring, *Survey Review*, 33, 261 (July 1996) 461-476.

The cutout image generation portion 114A specifies cutout ranges including moving objects as tracking subjects and generates cutout images of the cutout ranges. The cutout image generation portion 114A then supplies the cutout image display portion 116A with the cutout images. Herein, the cutout image generation portion 114A performs the processing same as the processing performed by the cutout image generation portion 114 described above. More specifically, in a case where the relative distances are larger than a predetermined threshold value, the cutout image generation portion 114A specifies cutout ranges to display the respective moving objects in different cutout image display windows and generates cutout images of respective images of the cutout ranges. Subsequently, the cutout image generation portion 114A supplies the cutout image display portion 116A with the cutout images of the respective specified cutout ranges. Also, in a case where the relative distances are equal to or smaller than the predetermined threshold value, the cutout image generation portion 114A specifies a cutout range to display the moving objects on one cutout display screen as a group of moving objects. The cutout image generation portion 114A then generates a cutout image of the specified cutout range and supplies the cutout image display portion 116A with the generated cutout image.

The cutout image display portion 116A thus displays the cutout image supplied from the cutout image generation portion 114A in the cutout image display window. As with the cutout image display portion 116, the cut out image display portion 116A displays respective moving objects in different cutout image display windows in a case where the relative distances are larger than the predetermined threshold value.

Figure 20:
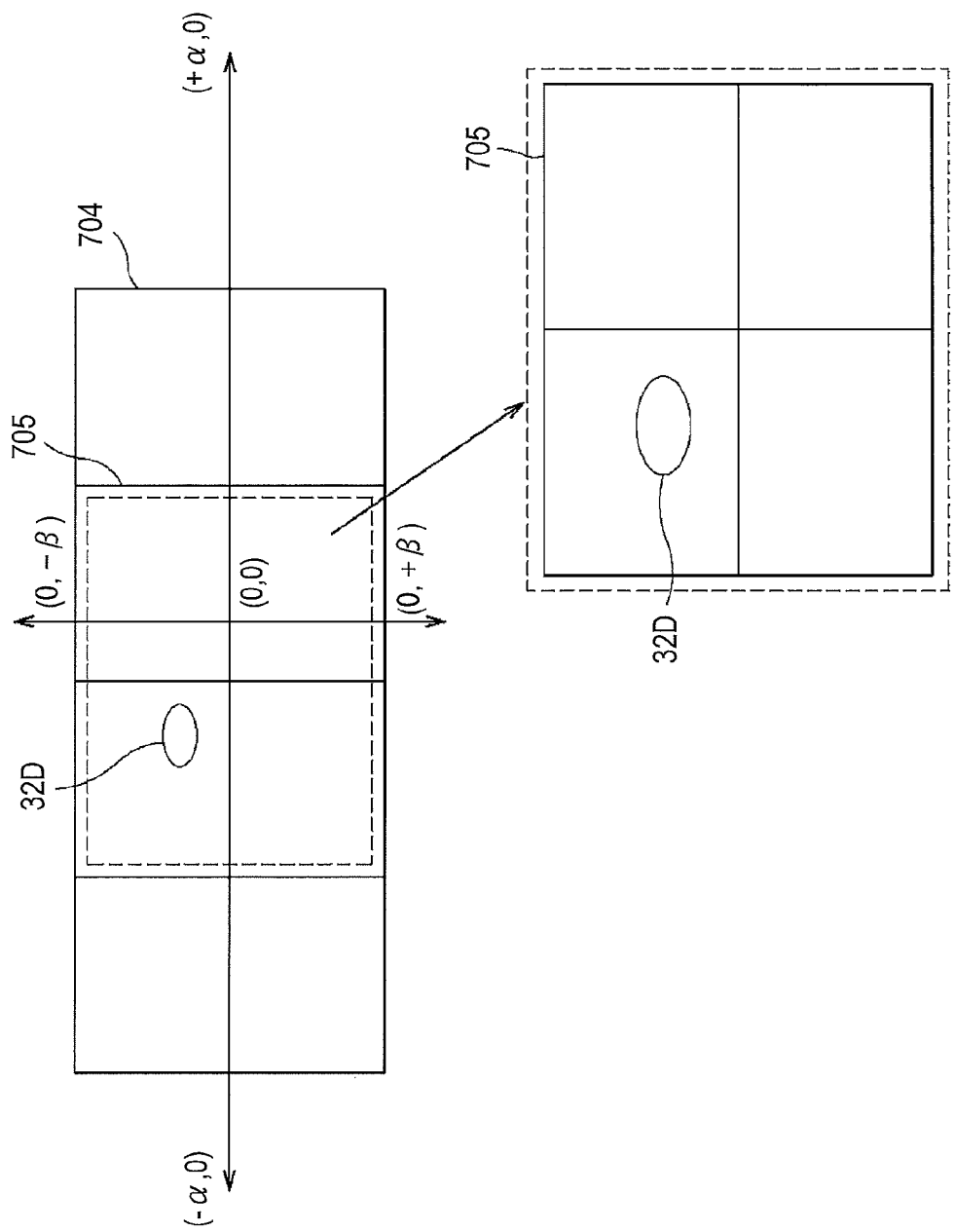
FIG. 20 is a view showing a panoramic entire image.

For example, as is shown in FIG. 20, the panoramic image generation portion 113A generates a panoramic entire image 704 specified by the angle coordinates having the center at (0, 0) and extending by $-\alpha$ degree (leftward) and $+\alpha$ degree (rightward) on the abscissa and by $-\beta$ degree (upward) and +β degree (downward) on the ordinate. In this manner, the panoramic image generation portion 113A controls a moving distance per pulse using an angle. The cutout image generation portion 114A specifies a cutout range 705 including a moving object 32D as a tracking subject. Herein, the cutout image generation portion 114A specifies the cutout range 705 in such a manner that the moving object 32D comes in closest proximity to the center of the cutout range 705. The cutout image generation portion 114A generates a cutout image of the cutout range 705 and supplies the cutout image display portion 116 with the generated cutout image.

Figure 21:
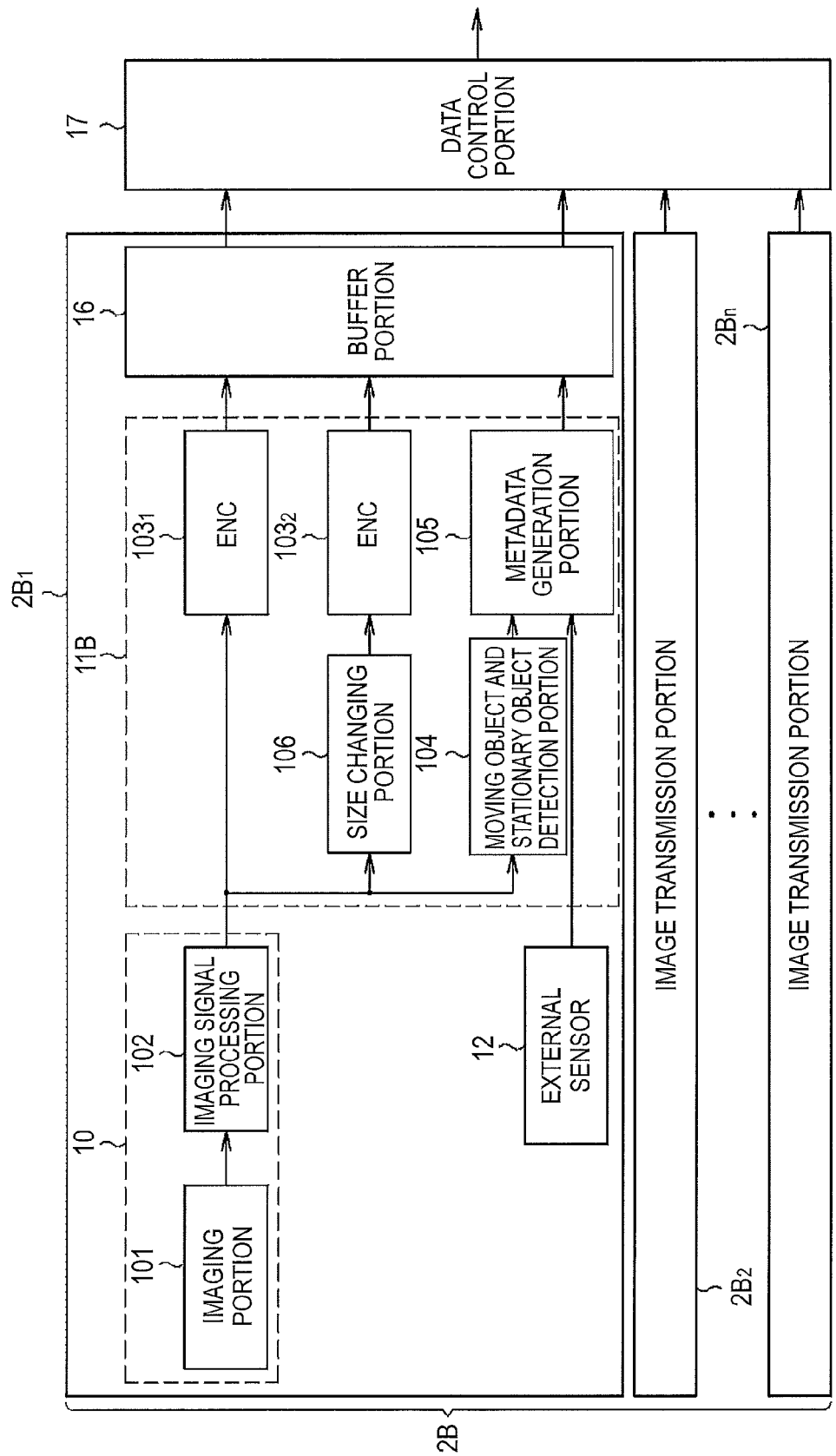
FIG. 21 is a view showing the internal configuration of the image transmission device provided to the image processing system.

It may be configured in such a manner that the image processing system 200 includes, for example, an image transmission device 2B having n (n is an integer equal to or larger than 2) image transmission portions $2B_1$, $2B_2$, ..., and $2B_n$ as shown in FIG. 21 instead of the image transmission device 2A. In this case, each of the image transmission portions $2B_1$, $2B_2$, ..., and $2B_n$ generates images of continuous regions and transmits a plurality of the images to the image processing device 3A via the data control portion 17. The image processing device 3A generates a panoramic entire image from a plurality of the continuous images received from the data control portion 17.

Regarding the image transmission portions $2B_1$, $2B_2$, ..., and $2B_n$ shown in FIG. 21, components same as those of the image transmission device 2A shown in FIG. 19 are labeled with the same reference numerals and detail descriptions are omitted herein. Also, the image transmission portion $2B_1$ alone will be described in the following on the assumption that the image transmission portions $2B_1$, $2B_2$, ..., and $2B_n$ are of the same configuration.

The image transmission portion $2B_1$ includes a camera portion 10, an image data processing portion 11B, an external sensor 12, and a buffer portion 16. The image data processing portion 11B includes an encoder $103_1$ as a first encoder, an encoder $103_2$ as a second encoder, a moving object and stationary object detection portion 104, a metadata generation portion 105, and a size changing portion 106.

An image frame generated by the imaging signal processing portion 102 is correlated with the number assigned to the camera portion 10 (camera number) and a frame number.

The encoder $103_1$ generates first compressed image data by applying encoding, for example, by the Motion JPEG on a plurality of image frames at first resolution outputted from the camera portion 10.

The size changing portion 106 generates image frames at second resolution (for example, QVGA) lower than the first resolution by applying processing, such as skipping and interpolation, to the image frames at the first resolution outputted from the camera portion 10.

The encoder $103_2$ generates second compressed image data by applying encoding processing to a plurality of the image frames at the second resolution outputted from the size changing portion 106. As with the encoder $103_1$, the encoder $103_2$ also performs compression coding, for example, by the Motion JPEG.

The image data at the first resolution from the encoder $103_1$, the image data at the second resolution from the encoder $103_2$, and the metadata from the metadata generation portion 105 are supplied to the buffer portion 16. The buffer portion 16 temporarily stores the supplied data in a buffer memory and supplies the data control portion 17 with the data later.

The data control portion 17 puts n items of image data at the first resolution, n items of image data at the second resolution, and metadata supplied from the respective image transmission portions $2B_1$, $2B_2$, ..., and $2B_n$ into a file and transmits the file to the image processing device 3A.

The data reception portion 111 supplies the panoramic image generation portion 113A with the image data at the first resolution and the image data at the second resolution received from the data control portion 17 in the image transmission device 2B. The data reception portion 111 supplies the position information extraction portion 112 with the image data at the first resolution and the metadata received from the data control portion 17 in the image transmission device 2B.

The panoramic image generation portion 113A performs decoding processing of the image data at the first resolution and the image data at the second resolution. The panoramic image generation portion 113A supplies the cutout image generation portion 114 with the decoded image data at the first resolution. Also, the panoramic image generation portion 113A generates a panoramic entire image using the decoded image data at the second resolution. The panoramic image generation portion 113A then supplies the panoramic image display portion 115A with the image data of the panoramic entire image. The panoramic image display portion 115A thus displays the panoramic entire image supplied from the panoramic image generation portion 113A in the entire image display window.

The cutout image generation portion 114A generates cutout images of tracking subjects on the basis of relative distances between the respective tracking subjects in the image data at the first resolution according to the position information extracted by the position information extraction portion 112.

In this manner, in a case where the panoramic entire image is generated from the image data generated by a plurality of the camera portions 10, given that the angle of view per used lens is known, then a value found by subtracting overlapping regions from the number of lenses×lens angle of view is defined as the angle of view of the entire region of the panoramic entire image. Also, the angle of view per camera portion is the value found by dividing the angle of view of the entire region by the number of lenses. Also, it is possible to calculate the cutout range from the angle per pixel in the panoramic entire image.

It should be noted that the image processing system 200 is capable of tracking and displaying tracking subjects by obtaining the position information (hereinafter, referred to as the position information Pn) of the tracking subjects, for example, according to the GPS, the beacon information, a radar, and so forth.

In this case, the image processing device 3A receives image data, for example, appended with the position information of the swivel base 15, from the image transmission device 2A. The position information Pn is obtained out of synchronization with the image data from the outside by the position information extraction portion 112.

The position information extraction portion 112 converts the position information Pn to a radian format and supplies the cutout image generation portion 114A with the position information Pn converted into the radian format.

The cutout image generation portion 114A calculates the azimuth angle of the coordinate (x, y) on the latitude and longitude of the center position P of a moving object specified when calculating a distance between the origin O and the center position P of the moving object and calculates a difference from the azimuth angle of the origin O. This difference is the center of the angle of view to be cut out. The cutout image generation portion 114A searches for an approximate image and specifies a cutout range to display the approximate image together with a plurality of nearby images.

The cutout image generation portion 114A calculates an angle produced with the origin O each time the position information Pn is supplied and calculates the coordinate of the position corresponding to the position information Pn. The image processing device 3A is thus capable of displaying the moving object continuously.

In this manner, the image processing system 200 calculates a distance between two points, that is, a distance from the origin to the moving object on the basis of two pieces of the latitude and longitude information of the origin O and the position information Pn. Accordingly, in a case where the sizes of the tracking subjects are known in advance or can be predicted, the image processing system 200 is capable of enlarging and displaying the tracking subjects by controlling a zooming operation of the camera portion 10.

Figure 22:
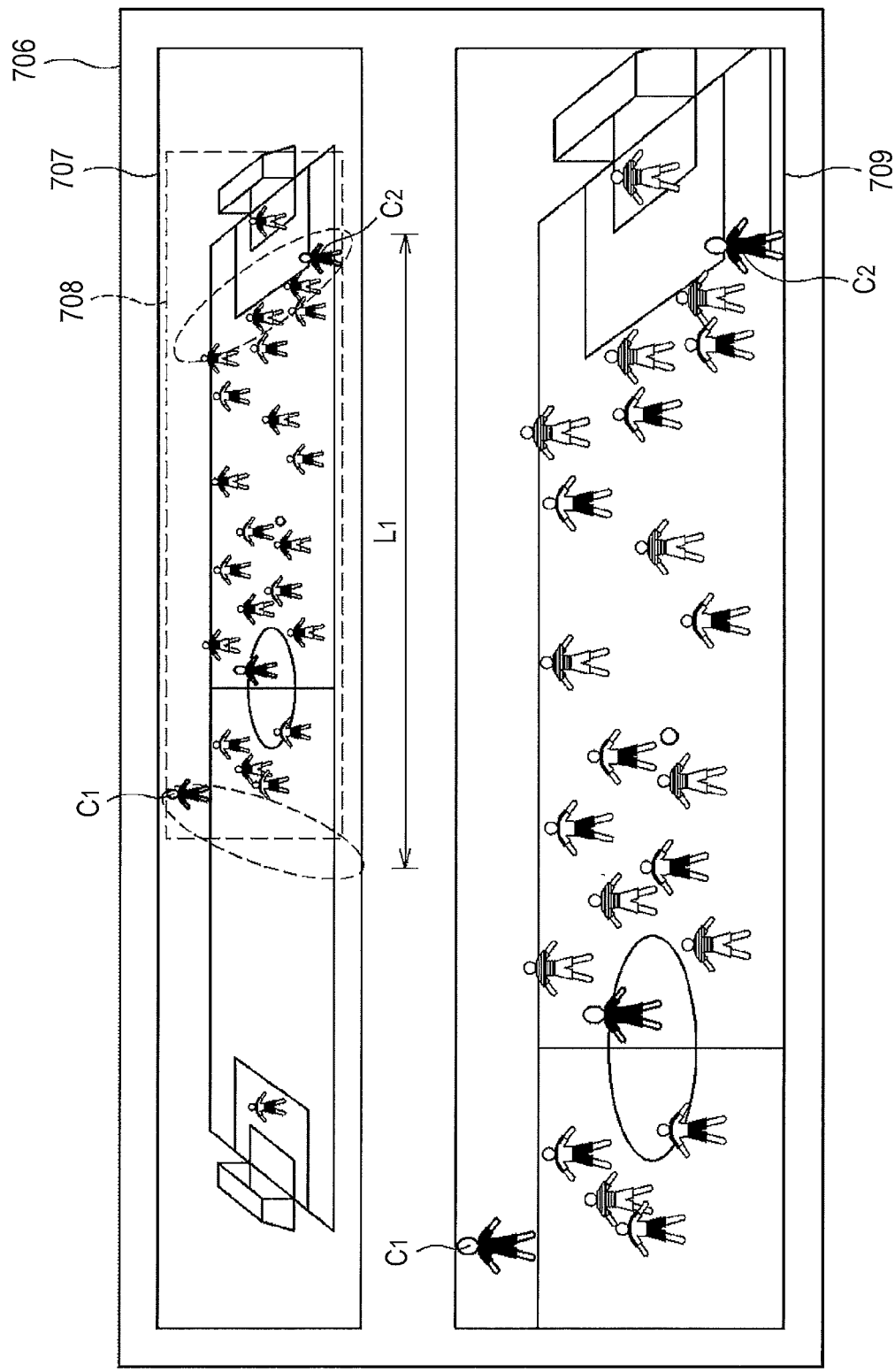
FIG. 22 is a view showing an example of a display screen shown on a display provided to the image processing device.
Figure 23:
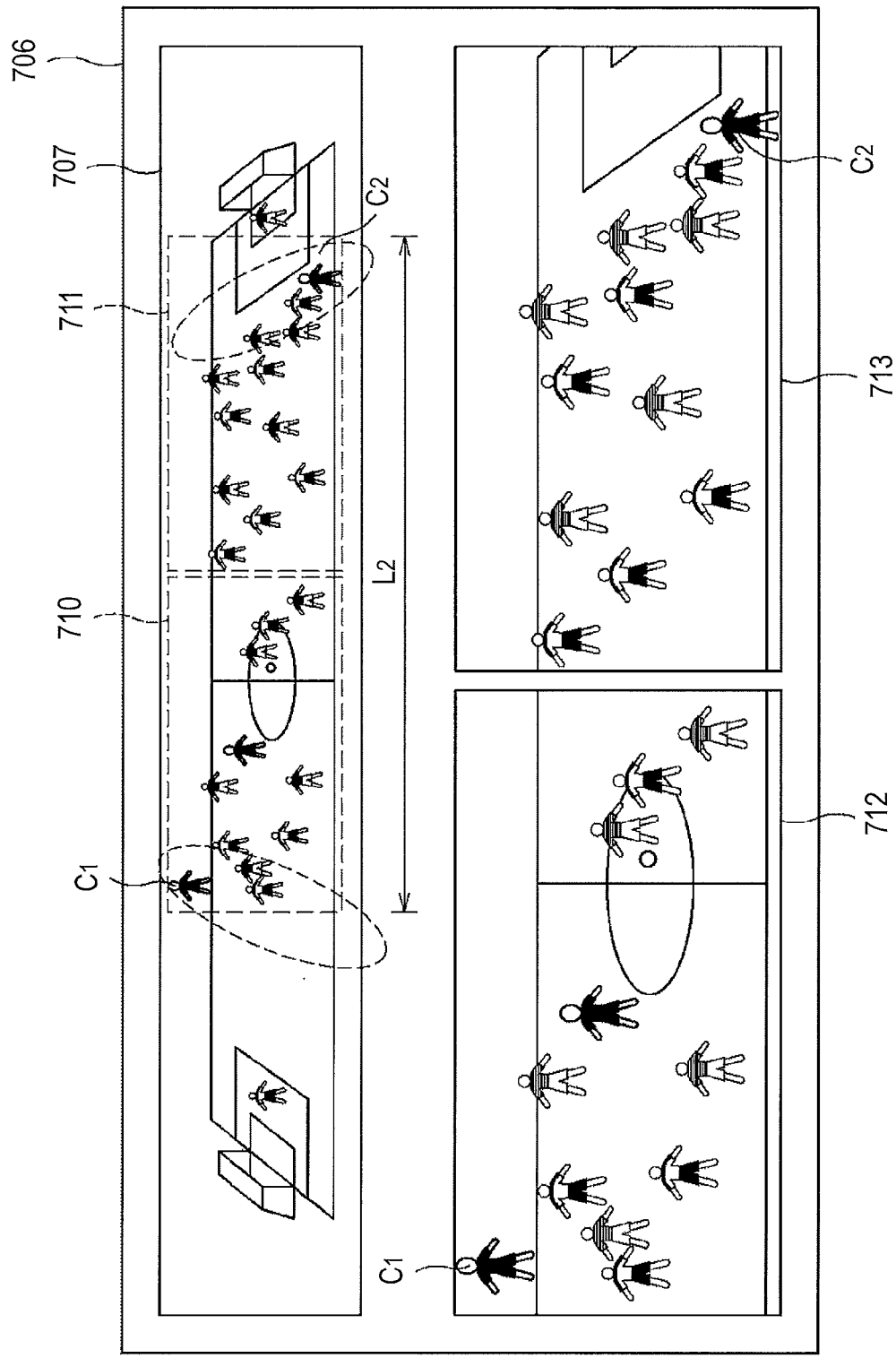
FIG. 23 is a view showing an example of a display screen shown on a display provided to the image processing device.
Figure 24:
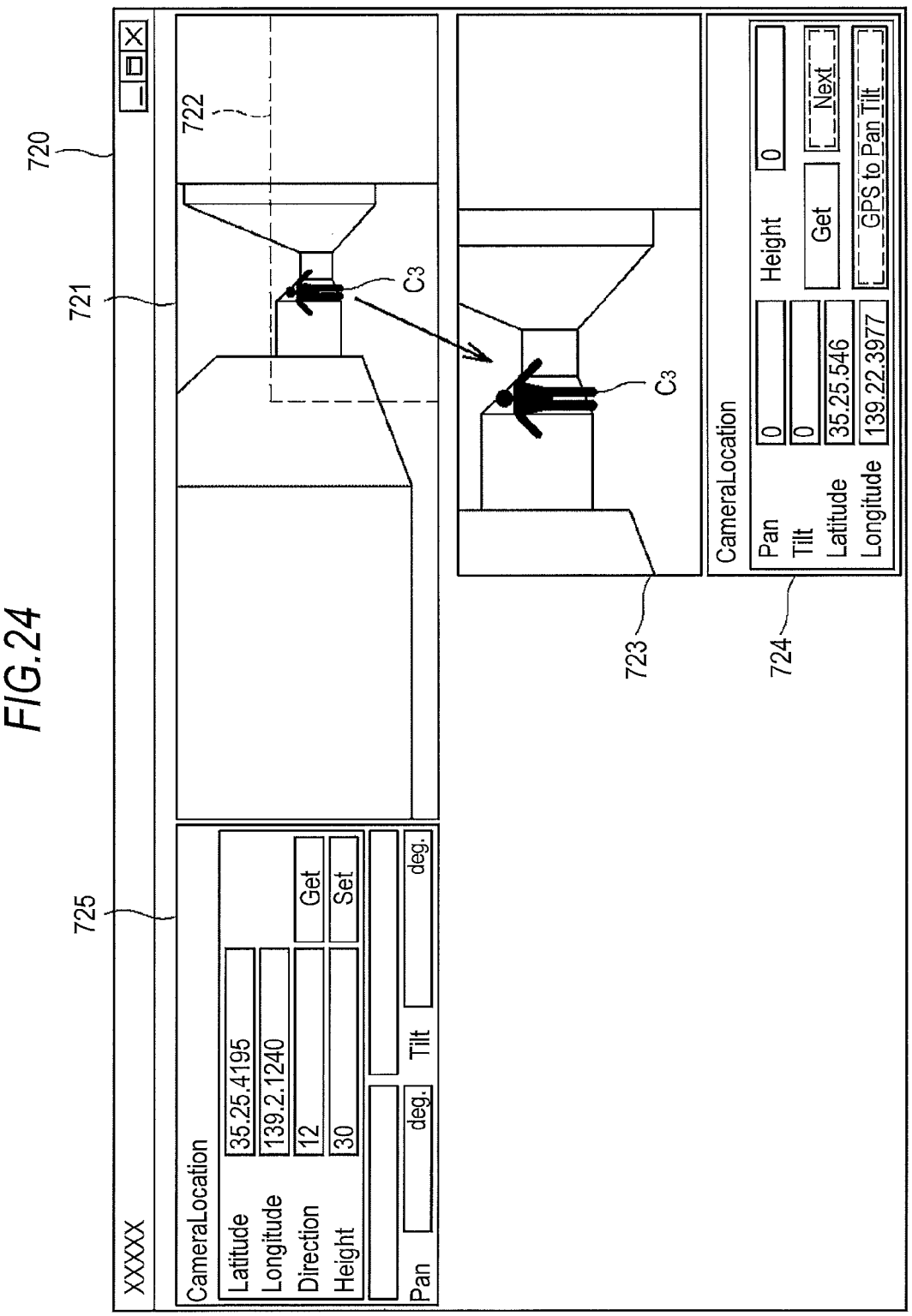
FIG. 24 is a view showing an example of a display screen shown on a display provided to the image processing device.

The image processing system 200 is capable of displaying display screens as shown, for example, in FIG. 22 through FIG. 24. A display screen 706 shown in FIG. 22 and FIG. 23 displays a video, for example, a soccer game. A panoramic entire image display window 707 scroll-displays the soccer field as a panoramic entire image. The cutout image generation portion 114A specifies a cutout range according to motions of a line judge $C_1$ and a line judge $C_2$ that are the tracking subjects. In an example of FIG. 22, the cutout image generation portion 114A determines that a distance $L_1$ in the lateral direction between the line judge $C_1$ and the line judge $C_2$ is equal to or smaller than the predetermined threshold value. The cutout image generation portion 114A then specifies a cutout range 708 including the line judge $C_1$ and the line judge $C_2$ and generates a cut out image, which is an enlarged image of the cutout range 708. The cutout image display portion 116A thus displays the cutout image including the line judge $C_1$ and the line judge $C_2$ in a cutout image display window 709.

In a display example shown in FIG. 23, the cutout image generation portion 114A determines that a distance $L_2$ in the lateral direction between the line judge $C_1$ and the line judge $C_2$ is larger than the predetermined threshold. The cutout image generation portion 114A then specifies a cutout range 710 including the line judge $C_1$ and a cutout range 711 including the line judge $C_2$. The cutout image generation portion 114A generates a cutout image, which is an enlarged image of the cutout range 710, and a cutout image, which is an enlarged image of the cutout range 711. The cutout image display portion 116A thus displays the cutout image, which is an enlarged image of the cutout range 710, and the cutout image, which is an enlarged image of the cutout range 711, in a cutout image display window 712 and a cutout image display window 713, respectively.

In the display examples shown in FIG. 22 and FIG. 23, it is possible to set the center position between the position of the line judge $C_1$ and the position of the line judge $C_2$ to the center position of the display angle of view of the entire image being displayed in the panoramic entire image display window 707.

In a case where the image processing system 200 generates a panoramic entire image using images generated by a plurality of the image transmission portions $2B_1$, $2B_2$, ..., and $2B_n$, it should appreciated that the method of specifying the center position of the panoramic entire image is not limited to the method using the center position of two points as described above. In this case, the numbers of moving objects within the respective image frames generated by the respective image transmission portions are summed up.

Then, the maximum number (mode value) of the numbers of moving objects within the image frames is specified and the display angle of view is specified by setting the center position to the camera portion 10 that captured as many moving objects as the mode value. Subsequently, an amount of movement of the camera portion 10 by which the display angle of view is moved gradually is calculated. The imaging direction is set to move, for example, in a direction of the camera portion 10 having the second largest value next to the mode value. An amount of movement of the camera portion 10 is, for example, 4 degrees/sec (560 pixels) at the maximum and normally about 140 pixels. An amount of movement per frame is about 10 pixels and about 40 pixels at the maximum.

In the display examples shown in FIG. 22 and FIG. 23, the panoramic image generation portion 113A calculates the center of a virtual angle of view from the position of the line judge $C_1$ and the position of the line judge $C_2$. The panoramic image display portion 115A scroll-displays the panoramic entire image in the panoramic entire image display window 707 according the motion of the line judges that differs from one scene to another.

Also, a display screen 720 shown in FIG. 24 is an example of the display screen displayed by a personal computer. In the display screen 720, the position information (height, angles (pan and tilt) from the camera portion 10, latitude, longitude, and so forth) of a moving object is displayed in a region 724. Also, the position information (latitude, longitude, angle in the line of sight, height, and so forth) of the installed position of the camera portion 10 is displayed in a region 725. In a case where the monitoring camera detects a moving object $C_3$, such as a suspicious individual, the display screen 720 displays a cutout image of a cutout range 722 including the moving object $C_3$ in a cutout image display window 723. In this manner, the image processing system 200 is used as a monitoring system used for monitoring by displaying a moving object in the cutout image display window 723. In the example of FIG. 24, the image can be either a moving image or a still image. In a case where the image is a still image, the image displayed in the cutout image display window 723 is updated in every arbitrary preset time.

As has been described, the image processing systems according to the embodiments of the present invention track and display a plurality of moving objects simultaneously by using the entire image and a cutout image(s). Accordingly, the user is able to keep track of the positional relation between the respective tracking subjects among a plurality of the tracking subjects in the entire image whereas the user is able to keep track of a whole picture of the tracking subjects, which is not kept track of by the mere wide angle imaging, in detail in the cutout image.

Also, with the image processing systems according to the embodiments of the present invention, even in a case where a specific tracking subject is distant from a group of a plurality of tracking subjects by a distance larger than the predetermined threshold, the user will not lose track of the tracking subject by newly preparing a display region of the predetermined angle of view.

Also, with the image processing systems according to the embodiments of the present invention, the user is able to track a plurality of tracking subjects having the relative distances equal to or smaller than the predetermined threshold value as a group. Accordingly, even when there are a large number of tracking subjects, it is possible to keep track of all the tracking subjects.

It should be appreciated that the present invention is not limited to the embodiments described above and it goes without saying that various modifications are possible within the scope of the invention.

In the embodiments described above, the image processing device 3 includes the entire image generation portion 113 and the entire image display portion 115 to control the entire image of a predetermined range to be displayed in the entire image display window. Also, the image processing device 3 includes the cutout image generation portion 114 and the cutout image display portion 116 to control a plurality of tracking subjects included in the entire image to be enlarged and displayed in the cutout image display window(s). It should be appreciated, however, that the present invention is not limited to the embodiments as above. For example, an image generation portion, an image display portion, and so forth may be provided to the outside of the image processing device as long as the entire image display control processing and the cutout image display control processing described above are performed.

The present application contains subject matter related to that disclosed in Japanese Priority Patent Application JP 2008-309969 filed in the Japan Patent Office on Dec. 4, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprised of a processor and a memory storing instructions to configure the processor to implement modules comprising:
    an object speed calculation portion that calculates a speed of a first object and a speed of a second object, the first and second objects being in a first image; and
    an image setting portion that sets a position corresponding to a second image that includes at least one of the first and second objects in the first image, the second image being a part of the first image;
    wherein the second image is displayed on a display, and a position corresponding to the second image that is part of the first image is updated based on the speed of the first object and the speed of the second object.

2. The image processing apparatus according to the claim 1, wherein the second image is outputted from the image processing apparatus to other apparatus, to be displayed.

3. The image processing apparatus according to the claim 1, wherein the first image is displayed on the display which displays the second image.

4. The image processing apparatus according to the claim 3, wherein the displayed second image is larger than the corresponding part of the displayed first image.

5. The image processing apparatus according to the claim 1, further comprising a receiving portion receives the first image.

6. The image processing apparatus according to the claim 1, further comprising a receiving portion receives the first image via a network.

7. The image processing apparatus according to the claim 1, wherein the first object is specified by a user.

8. The image processing apparatus according to the claim 1, wherein the first object is a moving object.

9. The image processing apparatus according to the claim 1, wherein the first image is a captured image.

10. The image processing apparatus according to the claim 1, wherein the first image is a panoramic image generated based on a plurality of images.

11. An image processing system comprised of a processor and a memory storing instructions to configure the processor to implement modules comprising:
    an imaging portion;
    an object speed calculation portion that calculates a speed of first object and a speed of a second object, the first and second objects being in a first image; and
    an image setting portion that sets a position corresponding to a second image that includes at least one of the first and second object in the first image, the second image being a part of the first image;
    wherein the second image is displayed on a display, and a position corresponding to the second image that is part of the first image is updated based on the speed of the first object and the speed of the second object.

12. The image processing system according to the claim 11, further comprising the display.

13. An image processing method comprising:
    calculating a speed of a first object and a speed of a second object, the first and second objects being in a first image;
    setting a position corresponding to a second image that includes at least one of the first and second objects in the first image, the second image being a part of the first image;
    causing the second image to be displayed; and
    updating a position corresponding to the second image that is part of the first image based on the speed of the first object and the speed of the second object.

14. An image processing apparatus comprised of a processor and a memory storing instructions to configure the processor to implement modules comprising:
    object speed calculation means for calculating a speed of a first object and a speed of a second object, the first and second objects being in a first image; and
    image setting means for setting a position corresponding to a second image that includes at least one of the first and second objects in the first image, the second image being a part of the first image;
    wherein the second image is displayed on a display, and a position corresponding to the second image that is part of the first image is updated based on the speed of the first object and the speed of the second object.

* * * * *